US012154582B2

(12) United States Patent
Eksler

(10) Patent No.: US 12,154,582 B2
(45) Date of Patent: Nov. 26, 2024

(54) METHOD AND SYSTEM FOR CODING METADATA IN AUDIO STREAMS AND FOR EFFICIENT BITRATE ALLOCATION TO AUDIO STREAMS CODING

(71) Applicant: VOICEAGE CORPORATION, Town of Mount Royal (CA)

(72) Inventor: Vaclav Eksler, Brno (CZ)

(73) Assignee: VOICEAGE CORPORATION

(*) Notice: Subject to any disclaimer, the term of this patent is extended or adjusted under 35 U.S.C. 154(b) by 0 days.

(21) Appl. No.: 17/596,567

(22) PCT Filed: Jul. 7, 2020

(86) PCT No.: PCT/CA2020/050944
§ 371 (c)(1),
(2) Date: Dec. 13, 2021

(87) PCT Pub. No.: WO2021/003570
PCT Pub. Date: Jan. 14, 2021

(65) Prior Publication Data

US 2022/0319524 A1 Oct. 6, 2022

Related U.S. Application Data

(60) Provisional application No. 62/871,253, filed on Jul. 8, 2019.

(51) Int. Cl.
*G10L 19/16* (2013.01)
*G10L 19/002* (2013.01)
(Continued)

(52) U.S. Cl.
CPC .......... *G10L 19/167* (2013.01); *G10L 19/002* (2013.01); *G10L 25/78* (2013.01); *G10L 19/008* (2013.01)

(58) Field of Classification Search
CPC ..... G10L 19/167; G10L 19/002; G10L 25/78; G10L 19/008
See application file for complete search history.

(56) References Cited

U.S. PATENT DOCUMENTS

| | | | |
|---|---|---|---|
| 5,630,011 | A | 5/1997 | Lim et al. |
| 7,657,427 | B2 | 2/2010 | Jelinek |

(Continued)

FOREIGN PATENT DOCUMENTS

| | | |
|---|---|---|
| CA | 3074750 | 3/2019 |
| EP | 3007168 | 4/2016 |

(Continued)

OTHER PUBLICATIONS

Herre, Jürgen, et al. "MPEG spatial audio object coding—the ISO/MPEG standard for efficient coding of interactive audio scenes." Journal of the Audio Engineering Society 60.9 (2012): pp. 655-673 (Year: 2012).*

(Continued)

*Primary Examiner* — Jesse S Pullias
*Assistant Examiner* — Michael C. Lee
(74) *Attorney, Agent, or Firm* — Fay Kaplun & Marcin, LLP

(57) ABSTRACT

A system and method code an object-based audio signal comprising audio objects in response to audio streams with associated metadata. In the system and method, a metadata processor codes the metadata and generates information about bit-budgets for the coding of the metadata of the audio objects. An encoder codes the audio streams while a bit-budget allocator is responsive to the information about the bit-budgets for the coding of the metadata of the audio objects from the metadata processor to allocate bitrates for the coding of the audio streams by the encoder.

44 Claims, 8 Drawing Sheets

(51) Int. Cl.
*G10L 19/008* (2013.01)
*G10L 25/78* (2013.01)

(56) References Cited

U.S. PATENT DOCUMENTS

| | | | |
|---|---|---|---|
| 10,359,827 | B1 | 7/2019 | Amarilio et al. |
| 2008/0262850 | A1* | 10/2008 | Taleb .................... G10L 19/008 704/500 |
| 2010/0153118 | A1 | 6/2010 | Hotho et al. |
| 2013/0030819 | A1 | 1/2013 | Purnhagen et al. |
| 2015/0255076 | A1* | 9/2015 | Fejzo ...................... G10L 19/24 704/500 |
| 2015/0364144 | A1 | 12/2015 | Fuchs et al. |
| 2016/0104496 | A1 | 4/2016 | Purnhagen et al. |
| 2016/0133263 | A1 | 5/2016 | Borss et al. |
| 2016/0210975 | A1 | 7/2016 | Vasilache et al. |
| 2016/0225377 | A1* | 8/2016 | Miyasaka ............. G10L 19/008 |
| 2016/0255348 | A1* | 9/2016 | Panchagnula ........ H04N 19/184 375/240.02 |
| 2017/0013387 | A1 | 1/2017 | Fersch et al. |
| 2017/0040021 | A1* | 2/2017 | Faure .................... G10L 19/028 |
| 2017/0041252 | A1* | 2/2017 | Das ....................... H04L 65/403 |
| 2017/0069328 | A1* | 3/2017 | Kawashima .......... G10L 19/002 |
| 2017/0365262 | A1 | 12/2017 | Miyasaka et al. |
| 2018/0315431 | A1* | 11/2018 | Badr ....................... G10L 25/84 |
| 2019/0027157 | A1 | 1/2019 | Tsingos et al. |
| 2019/0066701 | A1 | 2/2019 | Fatus et al. |
| 2019/0080700 | A1 | 3/2019 | Schug et al. |
| 2019/0103118 | A1 | 4/2019 | Atti et al. |
| 2019/0394605 | A1* | 12/2019 | Kim .......................... H04S 7/30 |
| 2020/0275171 | A1* | 8/2020 | Cloud ................ H04N 21/8456 |
| 2020/0314424 | A1 | 10/2020 | Hu et al. |
| 2021/0295855 | A1 | 9/2021 | Vasilache et al. |
| 2022/0172732 | A1 | 6/2022 | Ashour et al. |

FOREIGN PATENT DOCUMENTS

| | | |
|---|---|---|
| JP | 2019-003185 | 1/2019 |
| WO | 2014/192602 | 12/2014 |
| WO | WO 2019/056107 A1 | 3/2018 |
| WO | 2018/180531 | 10/2018 |
| WO | 2019/069710 | 4/2019 |
| WO | 2020/008105 A1 | 1/2020 |

OTHER PUBLICATIONS

Herre, Jürgen, et al. "MPEG-H 3D audio—The new standard for coding of immersive spatial audio." IEEE Journal of selected topics in signal processing 9.5 (2015): pp. 770-779 (Year: 2015).*

Definition of "once" in the Merriam Webster dictionary, available at https://web.archive.org/web/20190328172441/https://www.merriam-webster.com/dictionary/once (archived on Mar. 28, 2019)) (Year: 2019).*

3GPP Spec. TS 26.445: "Codec for Enhanced Voice Services (EVS). Detailled Algorithmic Description", v.12.0.0, Sep. 2014, pp. 17-130.

Dietz et al., "Overview Of The Evs Codec Architecture", IEEE, 2015, pp. 5698-5702.

Laaksonen et al., "Exploiting Time Warping in AMR-NB and AMR-WB Speech Coders", Eighth European Conference on Speech Communication and Technology, 2003, pp. 1729-1732.

Korhonen et al., "Toward bandwidth-efficient and error-robust audio streaming over lossy packet networks", Multimedia Systems, Vo. 10, No. 5, 2005, pp. 402-412.

Ananasso et al., "Digital Transmission", Satellite Communication Systems Design. Boston, MA: Springer US, 1993, pp. 417-552.

Purnhagen et al., "Error protection and concealment for HILN MPEG-4 parametric audio coding", Audio Engineering Society Convention 110. Audio Engineering Society, 2001, pp. 1-7.

* cited by examiner

METHOD AND SYSTEM FOR CODING METADATA IN AUDIO STREAMS AND FOR EFFICIENT BITRATE ALLOCATION TO AUDIO STREAMS CODING

TECHNICAL FIELD

The present disclosure relates to sound coding, more specifically to a technique for digitally coding object-based audio, for example speech, music or general audio sound. In particular, the present disclosure relates to a system and method for coding and a system and method for decoding an object-based audio signal comprising audio objects in response to audio streams with associated metadata.

In the present disclosure and the appended claims:

(a) The term "object-based audio" is intended to represent a complex audio auditory scene as a collection of individual elements, also known as audio objects. Also, as indicated herein above, "object-based audio" may comprise, for example, speech, music or general audio sound.

(b) The term "audio object" is intended to designate an audio stream with associated metadata. For example, in the present disclosure, an "audio object" is referred to as an independent audio stream with metadata (ISm).

(c) The term "audio stream" is intended to represent, in a bit-stream, an audio waveform, for example speech, music or general audio sound, and may consist of one channel (mono) though two channels (stereo) might be also considered. "Mono" is the abbreviation of "monophonic" and "stereo" the abbreviation of "stereophonic."

(d) The term "metadata" is intended to represent a set of information describing an audio stream and an artistic intension used to translate the original or coded audio objects to a reproduction system. The metadata usually describes spatial properties of each individual audio object, such as position, orientation, volume, width, etc. In the context of the present disclosure, two sets of metadata are considered:

- input metadata: unquantized metadata representation used as an input to a codec; the present disclosure is not restricted a specific format of input metadata; and
- coded metadata: quantized and coded metadata forming part of a bit-stream transmitted from an encoder to a decoder.

(e) The term "audio format" is intended to designate an approach to achieve an immersive audio experience.

(f) The term "reproduction system" is intended to designate an element, in a decoder, capable of rendering audio objects, for example but not exclusively in a 3D (Three-Dimensional) audio space around a listener using the transmitted metadata and artistic intension at the reproduction side. The rendering can be performed to a target loudspeaker layout (e.g. 5.1 surround) or to headphones while the metadata can be dynamically modified, e.g. in response to a head-tracking device feedback. Other types of rendering may be contemplated.

BACKGROUND

In last years, the generation, recording, representation, coding, transmission, and reproduction of audio is moving towards enhanced, interactive and immersive experience for the listener. The immersive experience can be described e.g. as a state of being deeply engaged or involved in a sound scene while the sounds are coming from all directions. In immersive audio (also called 3D audio), the sound image is reproduced in all 3 dimensions around the listener taking into account a wide range of sound characteristics like timbre, directivity, reverberation, transparency and accuracy of (auditory) spaciousness. Immersive audio is produced for given reproduction systems, i.e. loudspeaker configurations, integrated reproduction systems (sound bars) or headphones. Then interactivity of an audio reproduction system can include e.g. an ability to adjust sound levels, change positions of sounds, or select different languages for the reproduction.

There are three fundamental approaches (also referred below as audio formats) to achieve an immersive audio experience.

A first approach is a channel-based audio where multiple spaced microphones are used to capture sounds from different directions while one microphone corresponds to one audio channel in a specific loudspeaker layout. Each recorded channel is supplied to a loudspeaker in a particular location. Examples of channel-based audio comprise, for example, stereo, 5.1 surround, 5.1+4 etc.

A second approach is a scene-based audio which represents a desired sound field over a localized space as a function of time by a combination of dimensional components. The signals representing the scene-based audio are independent of the audio sources positions while the sound field has to be transformed to a chosen loudspeakers layout at the rendering reproduction system. An example of scene-based audio is ambisonics.

A third, last immersive audio approach is an object-based audio which represents an auditory scene as a set of individual audio elements (for example singer, drums, guitar) accompanied by information about, for example their position in the audio scene, so that they can be rendered at the reproduction system to their intended locations. This gives an object-based audio a great flexibility and interactivity because each object is kept discrete and can be individually manipulated.

Each of the above described audio formats has its pros and cons. It is thus common that not only one specific format is used in an audio system, but they might be combined in a complex audio system to create an immersive auditory scene. An example can be a system that combines a scene-based or channel-based audio with an object-based audio, e.g. ambisonics with few discrete audio objects.

The present disclosure presents in the following description a framework to encode and decode object-based audio. Such framework can be a standalone system for object-based audio format coding, or it could form part of a complex immersive codec that may contain coding of other audio formats and/or combination thereof.

SUMMARY

According to a first aspect, the present disclosure provides a system for coding an object-based audio signal comprising audio objects in response to audio streams with associated metadata, comprising a metadata processor for coding the metadata, the metadata processor generating information about bit-budgets for the coding of the metadata of the audio objects. An encoder codes the audio streams, and a bit-budget allocator is responsive to information about the bit-budgets for the coding of the metadata of the audio objects from the metadata processor to allocate bitrates for the coding of the audio streams by the encoder.

The present disclosure also provides a method for coding an object-based audio signal comprising audio objects in response to audio streams with associated metadata, comprising coding the metadata, generating information about bit-budgets for the coding of the metadata of the audio objects, encoding the audio streams, and allocating bitrates for the coding of the audio streams in response to the information about the bit-budgets for the coding of the metadata of the audio objects.

According to a third aspect, there is provided a system for decoding audio objects in response to audio streams with associated metadata, comprising a metadata processor for decoding the metadata of the audio objects and for supplying information about the respective bit-budgets of the metadata of the audio objects, a bit-budget allocator responsive to the metadata bit-budgets of the audio objects to determine core-decoder bitrates of the audio streams, and a decoder of the audio streams using the core-decoder bitrates determined in the bit-budget allocator.

The present disclosure further provides a method for decoding audio objects in response to audio streams with associated metadata, comprising decoding the metadata of the audio objects and supplying information about respective bit-budgets of the metadata of the audio objects, determining core-decoder bitrates of the audio streams using the metadata bit-budgets of the audio objects, and decoding the audio streams using the determined core-decoder bitrates.

The foregoing and other objects, advantages and features of the system and method for coding an object-based audio signal and the system and method for decoding an object-based audio signal will become more apparent upon reading of the following non-restrictive description of illustrative embodiments thereof, given by way of example only with reference to the accompanying drawings.

DETAILED DESCRIPTION

The present disclosure provides an example of mechanism for coding the metadata. The present disclosure also provides a mechanism for flexible intra-object and inter-object bitrate adaptation, i.e. a mechanism that distributes the available bitrate as efficiently as possible. In the present disclosure, it is further considered that the bitrate is fixed (constant). However, it is within the scope of the present disclosure to similarly consider an adaptive bitrate, for example (a) in an adaptive bitrate-based codec or (b) as a result of coding a combination of audio formats coded otherwise at a fixed total bitrate.

There is no description in the present disclosure as to how audio streams are actually coded in a so-called "core-encoder." In general, the core-encoder for coding one audio stream can be an arbitrary mono codec using adaptive bitrate coding. An example is a codec based on the EVS codec as described in Reference [1] with a fluctuating bit-budget that is flexibly and efficiently distributed between modules of the core-encoder, for example as described in Reference [2]. The full contents of References [1] and [2] are incorporated herein by reference.

1. Framework for Coding of Audio Objects

As a non-limitative example, the present disclosure considers a framework that supports simultaneous coding of several audio objects (for example up to 16 audio objects) while a fixed constant ISm total bitrate, referred to as ism_total_brate, is considered for coding the audio objects, including the audio streams with their associated metadata. It should be noted that the metadata are not necessarily transmitted for at least some of the audio objects, for example in the case of non-diegetic content. Non-diegetic sounds in movies, TV shows and other videos are sound that the characters cannot hear. Soundtracks are an example of non-diegetic sound, since the audience members are the only ones to hear the music.

In the case of coding a combination of audio formats in the framework, for example an ambisonics audio format with two (2) audio objects, the constant total codec bitrate, referred to as codec_total_brate, then represents a sum of the ambisonics audio format bitrate (i.e., the bitrate to encode the ambisonics audio format) and the ISm total bitrate ism_total_brate (i.e. the sum of bitrates to code the audio objects, i.e. the audio streams with the associated metadata).

The present disclosure considers a basic non-limitative example of input metadata consisting of two parameters, namely azimuth and elevation, which are stored per audio frame for each object. In this example, an azimuth range of [−180°, 180°), and an elevation range of [−90°, 90°], is considered. However, it is within the scope of the present disclosure to consider only one or more than two (2) metadata parameters.

2. Object-Based Coding

Figure 1:
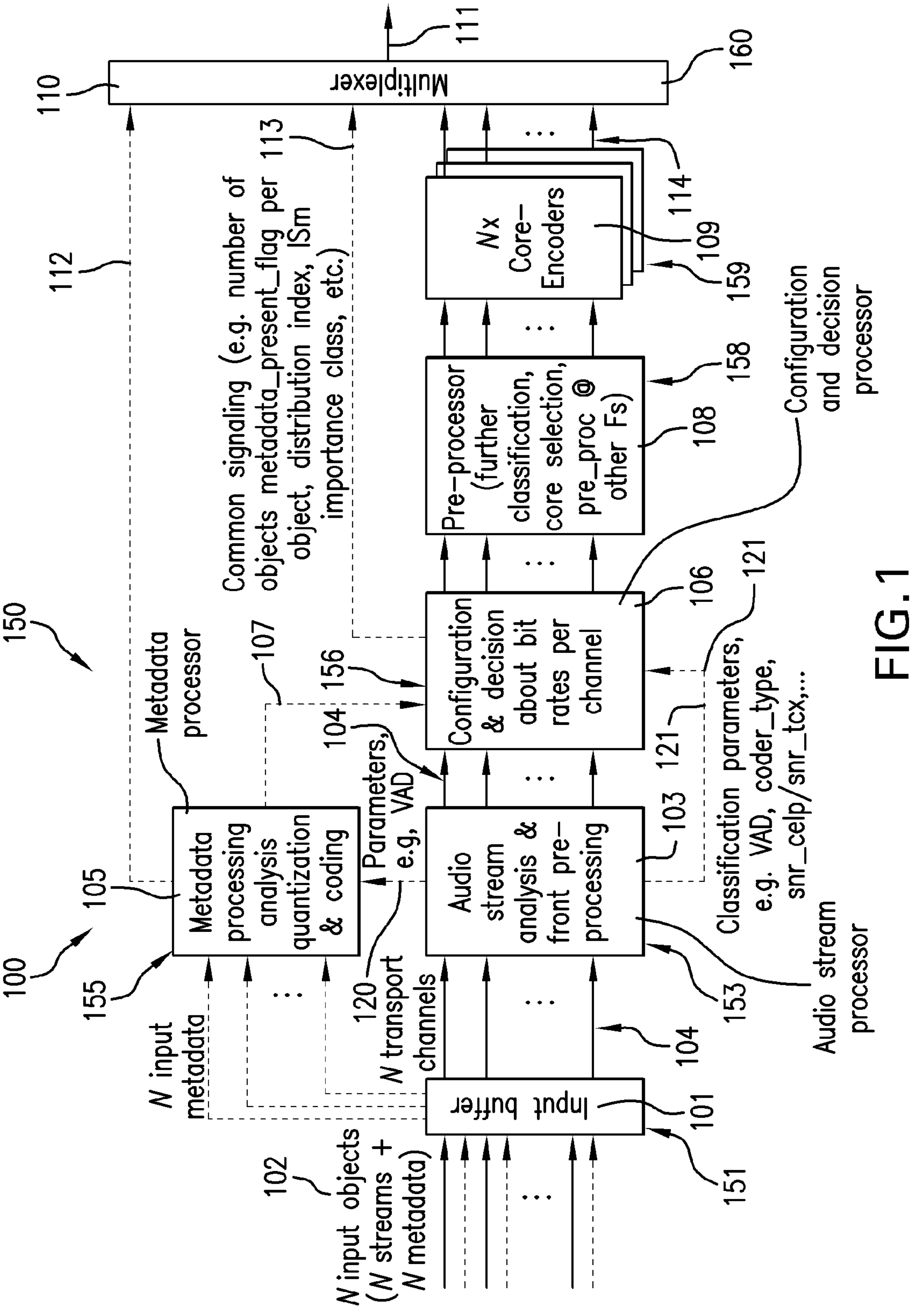
FIG. 1 is a schematic block diagram illustrating concurrently the system for coding an object-based audio signal and the corresponding method for coding the object-based audio signal.

FIG. 1 is a schematic block diagram illustrating concurrently the system 100, comprising several processing blocks, for coding an object-based audio signal and the corresponding method 150 for coding the object-based audio signal.

2.1 Input Buffering

Referring to FIG. 1, the method 150 for coding the object-based audio signal comprises an operation of input buffering 151. To perform the operation 151 of input buffering, the system 100 for coding the object-based audio signal comprises an input buffer 101.

The input buffer 101 buffers a number N of input audio objects 102, i.e. a number N of audio streams with the associated respective N metadata. The N input audio objects 102, including the N audio streams and the N metadata associated to each of these N audio streams are buffered for one frame, for example a 20 ms long frame. As well known in the art of sound signal processing, the sound signal is sampled at a given sampling frequency and processed by successive blocks of these samples called "frames" each divided into a number of "sub-frames."

2.2 Audio Streams Analysis and Front Pre-Processing

Still referring to FIG. 1, the method 150 for coding the object-based audio signal comprises an operation of analysis and front pre-processing 153 of the N audio streams. To perform the operation 153, the system 100 for coding the object-based audio signal comprises an audio stream processor 103 to analyze and front pre-process, for example in parallel, the buffered N audio streams transmitted from the input buffer 101 to the audio stream processor 103 through a number N of transport channels 104, respectively.

The analysis and front pre-processing operation 153 performed by the audio stream processor 103 may comprise, for example, at least one of the following sub-operations: time-domain transient detection, spectral analysis, long-term prediction analysis, pitch tracking and voicing analysis, voice/sound activity detection (VAD/SAD), bandwidth detection, noise estimation and signal classification (which may include in a non-limitative embodiment (a) core-encoder selection between, for example, ACELP core-encoder, TCX core-encoder, HQ core-encoder, etc., (b) signal type classification between, for example, inactive core-encoder type, unvoiced core-encoder type, voiced core-encoder type, generic core-encoder type, transition core-encoder type, and audio core-encoder type, etc., (c) speech/music classification, etc.). Information obtained from the analysis and front pre-processing operation 153 is supplied to a configuration and decision processor 106 through la line 121. Examples of the foregoing sub-operations are described in Reference [1] in relation to the EVS codec and, therefore, will not be further described in the present disclosure.

2.3 Metadata Analysis, Quantization and Coding

The method 150 of FIG. 1, for coding the object-based audio signal comprises an operation of metadata analysis, quantization and coding 155. To perform the operation 155, the system 100 for coding the object-based audio signal comprises a metadata processor 105.

2.3.1 Metadata Analysis

Signal classification information 120 (for example VAD or localVAD flag as used in the EVS codec (See Reference [1]) from the audio stream processor 103 is supplied to the metadata processor 105. The metadata processor 105 comprises an analyzer (not shown) of the metadata of each of the N audio objects to determine whether the current frame is inactive (for example VAD=0) or active (for example VAD≠0) with respect to this particular audio object. In inactive frames, no metadata is coded by the metadata processor 105 relative of that object. In active frames, the metadata are quantized and coded for this audio object using a variable bitrate. More details about metadata quantization and coding will be provided in the following Sections 2.3.2 and 2.3.3.

2.3.2 Metadata Quantization

The metadata processor 105 of FIG. 1 quantizes and codes the metadata of the N audio objects, in the described non-restrictive illustrative embodiments, sequentially in a loop while a certain dependency can be employed between quantization of audio objects and the metadata parameters of these audio objects.

As indicated herein above, in the present disclosure, two metadata parameters, azimuth and elevation (as included in the N input metadata), are considered. As a non-limitative example, the metadata processor 105 comprises a quantizer (not shown) of the following metadata parameter indexes using the following example resolution to reduce the number of bits being used:

- Azimuth parameter: A 12-bit azimuth parameter index from a file of the input metadata is quantized to $B_{az}$-bit index (for example $B_{az}$=7). Giving the minimum and maximum azimuth limits (−180 and +180°), a quantization step for a ($B_{az}$=7)-bit uniform scalar quantizer is 2.835°.
- Elevation parameter: A 12-bit elevation parameter index from the input metadata file is quantized to $B_{el}$-bit index (for example $B_{el}$=6). Giving the minimum and maximum elevation limits (−90° and +90°), a quantization step for a ($B_{el}$=6)-bit uniform scalar quantizer is 2.857°.

A total metadata bit-budget for coding the N metadata and a total number quantization bits for quantizing the metadata parameter indexes (i.e. the quantization index granularity and thus the resolution) may be made dependent on the bitrate(s) codec_total_brate, ism_total_brate and/or element_brate (the latter resulting from a sum of a metadata bit-budget and/or a core-encoder bit-budget related to one audio object).

The azimuth and elevation parameters can be represented as one parameter, for example by a point on a sphere. In such a case, it is within the scope of the present disclosure to implement different metadata including two or more parameters.

2.3.3 Metadata Coding

Both azimuth and elevation indexes, once quantized, can be coded by a metadata encoder (not shown) of the metadata processor 105 using either absolute or differential coding. As known, absolute coding means that a current value of a parameter is coded. Differential coding means that a difference between a current value and a previous value of a parameter is coded. As the indexes of the azimuth and elevation parameters usually evolve smoothly (i.e. a change in azimuth or elevation position can be considered as continuous and smooth), differential coding is used by default. However, absolute coding may be used, for example in the following instances:

- There is too large a difference between current and previous values of the parameter index which would result in a higher or equal number of bits for using differential coding compared to using absolute coding (may happen exceptionally);
- No metadata were coded and sent in the previous frame;
- There were too many consecutive frames with differential coding. In order to control decoding in a noisy channel (Bad Frame Indicator, BFI=1). For example, the metadata encoder codes the metadata parameter indexes using absolute coding if a number of consecutive frames which are coded using differential is higher that a maximum number of consecutive frames coded using different coding. The latter maximum number of consecutive frames is set to β. In a non-restrictive illustrative example, β=10 frames.

The metadata encoder produces a 1-bit absolute coding flag, $flag_{abs}$, to distinguish between absolute and differential coding.

In the case of absolute coding, the coding flag, $flag_{abs}$, is set to 1, and is followed by the $B_{az}$-bit (or $B_{el}$-bit) index coded using absolute coding, where $B_{az}$ and $B_{el}$ refer to the above mentioned indexes of the azimuth and elevation parameters to be coded, respectively.

In the case of differential coding, the 1-bit coding flag, $flag_{abs}$, is set to 0 and is followed by a 1-bit zero coding flag, $flag_{zero}$, signaling a difference Δ between the $B_{az}$-bit indexes (respectively the $B_{el}$-bit indices) in the current and previous frames equal to 0. If the difference Δ is not equal to 0, the metadata encoder continues coding by producing a 1-bit sign flag, $flag_{sign}$, followed by a difference index, of which the number of bits is adaptive, in a form of, for example, a unary code indicative of the value of the difference Δ.

Figure 2:
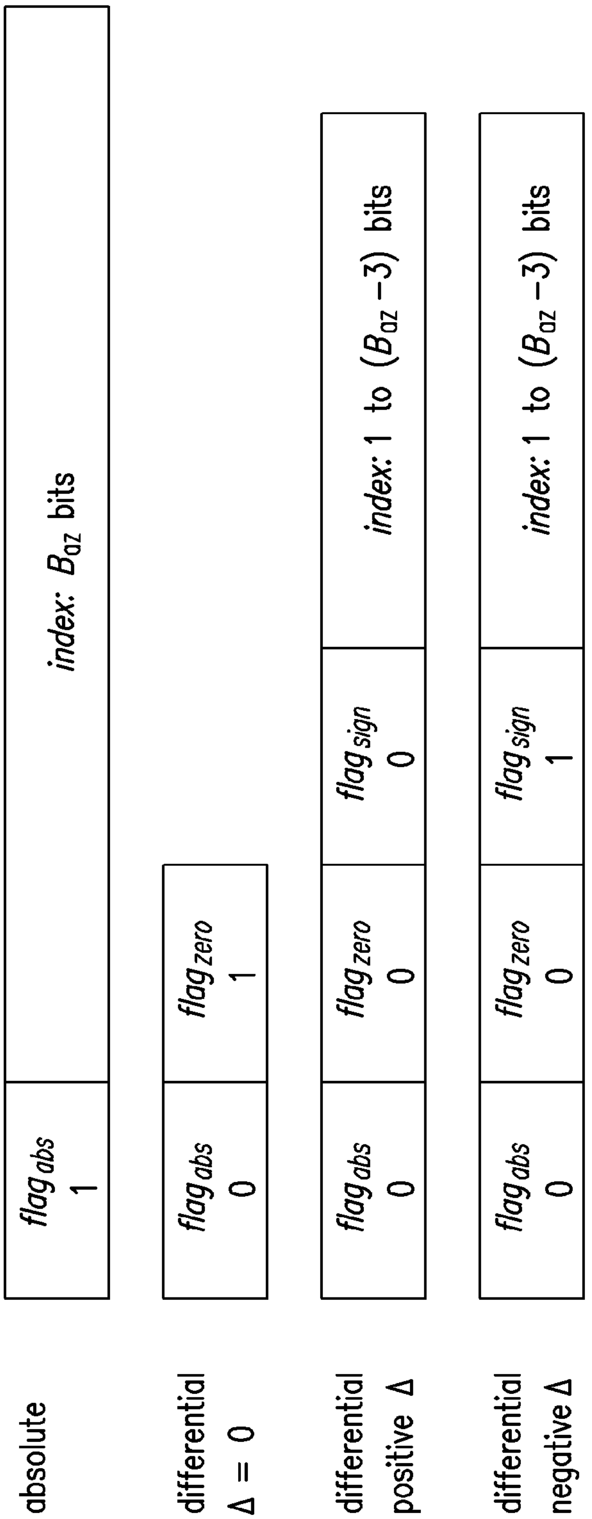
FIG. 2 is a diagram showing different scenarios of bit-stream coding of one metadata parameter.

FIG. 2 is a diagram showing different scenarios of bit-stream coding of one metadata parameter.

Referring to FIG. 2, it is noted that not all metadata parameters are always transmitted in every frame. Some might be transmitted only in every $y^{th}$ frame, some are not sent at all for example when they do not evolve, they are not important or the available bit-budget is low. Referring to FIG. 2, for example:

- in the case of absolute coding (first line of FIG. 2), the absolute coding flag, $flag_{abs}$, and the $B_{az}$-bit index (respectively the $B_{el}$-bit index) are transmitted;
- in the case of differential coding with the difference Δ between the $B_{az}$-bit indexes (respectively the $B_{el}$-bit indexes) in the current and previous frames equal to 0 (second line of FIG. 2), the absolute coding flag, $flag_{abs}$=0, and the zero coding flag, $flag_{zero}$=1 are transmitted;
- in the case of differential coding with a positive difference Δ between the $B_{az}$-bit index (respectively the $B_{e1}$-bit indexes) in the current and previous frames (third line of FIG. 2), the absolute coding flag, $flag_{abs}$=0, the zero coding flag, $flag_{zero}$=0, the sign flag, $flag_{sign}$=0, and the difference index (1 to ($B_{az}$-3)-bits index (respectively 1 to ($B_{el}$-3)-bits index)) are transmitted; and
- in the case of differential coding with a negative difference Δ between the $B_{az}$-bit indexes (respectively the $B_{el}$-bit indexes) in the current and previous frames (last line of FIG. 2), the absolute coding flag, $flag_{abs}$=0, the zero coding flag, $flag_{zero}$=0, the sign flag, $flag_{sign}$=1, and the difference index (1 to ($B_{az}$-3)-bits index (respectively 1 to ($B_{el}$-3)-bits index)) are transmitted.

2.3.3.1 Intra-Object Metadata Coding Logic

The logic used to set absolute or differential coding may be further extended by an intra-object metadata coding logic. Specifically, in order to limit a range of metadata coding bit-budget fluctuation between frames and thus to avoid too low a bit-budget left for the core-encoders 109, the metadata encoder limits absolute coding in a given frame to one, or generally to a number as low as possible of, metadata parameters.

In the non-limitative example of azimuth and elevation metadata parameter coding, the metadata encoder uses a logic that avoids absolute coding of the elevation index in a given frame if the azimuth index was already coded using absolute coding in the same frame. In other words, the azimuth and elevation parameters of one audio object are (practically) never both coded using absolute coding in a same frame. As a consequence, the absolute coding flag, $flag_{abs.ele}$, for the elevation parameter is not transmitted in the audio object bit-stream if the absolute coding flag, $flag_{abs.azi}$, for the azimuth parameter is equal to 1.

It is also within the scope of the present disclosure to make the intra-object metadata coding logic bitrate dependent. For example, both the absolute coding flag, $flag_{abs.ele}$, for the elevation parameter and the absolute coding flag, $flag_{abs.azi}$, for the azimuth parameter can be transmitted in a same frame is the bitrate is sufficiently large.

2.3.3.2 Inter-Object Metadata Coding Logic

The metadata encoder may apply a similar logic to metadata coding of different audio objects. The implemented inter-object metadata coding logic minimizes the number of metadata parameters of different audio objects coded using absolute coding in a current frame. This is achieved by the metadata encoder mainly by controlling frame counters of metadata parameters coded using absolute coding chosen from robustness purposes and represented by the parameter β. As a non-limitative example, a scenario where the metadata parameters of the audio objects evolve slowly and smoothly is considered. In order to control decoding in a noisy channel where indexes are coded using absolute coding every β frames, the azimuth $B_{az}$-bit index of audio object #1 is coded using absolute coding in frame M, the elevation $B_{el}$-bit index of audio object #1 is coded using absolute coding in frame M+1, the azimuth $B_{az}$-bit index of audio object #2 is encoded using absolute coding in frame M+2, the elevation $B_{el}$-bit index of object #2 is coded using absolute coding in frame M+3, etc.

Figure 3:
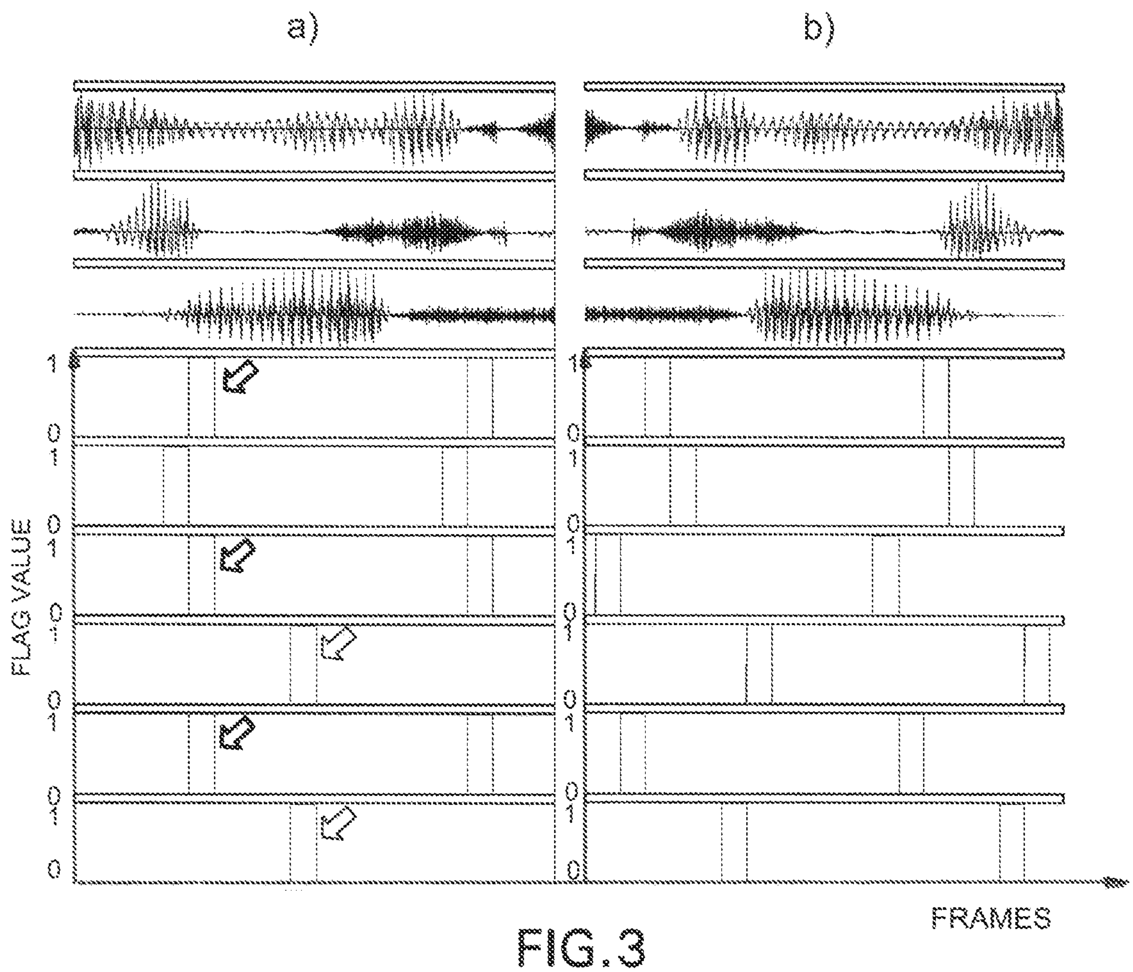
FIG. 3*a* is a graph showing values of an absolute coding flag, $flag_{abs}$, for metadata parameters of three (3) audio objects without using an inter-object metadata coding logic.
FIG. 3*b* is a graph showing values of the absolute coding flag, $flag_{abs}$, for the metadata parameters of the three (3) audio objects using the inter-object metadata coding logic, wherein arrows indicate frames where the value of several absolute coding flags equal to 1.

FIG. 3*a* is a graph showing values of the absolute coding flag, $flag_{abs}$, for abs, metadata parameters of three (3) audio objects without using the inter-object metadata coding logic, and FIG. 3*b* is a graph showing values of the absolute coding flag, $flag_{abs}$, for the metadata parameters of the three (3) audio objects using the inter-object metadata coding logic. In FIG. 3*a*, the arrows indicate frames where the value of several absolute coding flags is equal to 1.

More specifically, FIG. 3*a* shows the values of the absolute coding flag, $flag_{abs}$, for two metadata parameters (azimuth and elevation in this particular example) for the audio objects without using the inter-object metadata coding logic, while FIG. 3*b* shows the same values but with the inter-object metadata coding logic implemented. The graphs of FIGS. 3*a* and 3*b* correspond to (from top to bottom):

- audio stream of audio object #1;
- audio stream of audio object #2;
- audio stream of audio object #3,
- absolute coding flag, $flag_{abs,azi}$, for the azimuth parameter of audio object #1;
- absolute coding flag, $flag_{abs,ele}$, for the elevation parameter of audio object #1;
- absolute coding flag, $flag_{abs,azi}$, for the azimuth parameter of audio object #2;
- absolute coding flag, $flag_{abs,ele}$, for the elevation parameter of audio object #2;
- absolute coding flag, $flag_{abs,azi}$, for the azimuth parameter of audio object #3; and
- absolute coding flag, $flag_{abs,ele}$, for the elevation parameter of audio object #3.

It can be seen from FIG. 3*a* that several $flag_{abs}$ may have a value equal to 1 (see the arrows) in a same frame when the inter-object metadata coding logic is not used. In contrast, FIG. 3*b* shows that only one absolute flag, $flag_{abs}$, may have a value equal to 1 in a given frame when the inter-object metadata coding logic is used.

The inter-object metadata coding logic may also be made bitrate dependent.

In this case, for example, more that one absolute flag, $flag_{abs}$, may have a value equal to 1 in a given frame even when the inter-object metadata coding logic is used, if the bitrate is sufficiently large.

A technical advantage of the inter-object metadata coding logic and the intra-object metadata coding logic is to limit a range of fluctuation of the metadata coding bit-budget between frames. Another technical advantage is to increase robustness of the codec in a noisy channel; when a frame is lost, then only a limited number of metadata parameters from the audio objects coded using absolute coding is lost. Consequently, any error propagated from a lost frame affects only a small number of metadata parameters across the audio objects and thus does not affect the whole audio scene (or several different channels).

A global technical advantage of analyzing, quantizing and coding the metadata separately from the audio streams is, as described hereinabove, to enable processing specially adapted to the metadata and more efficient in terms of metadata coding bitrate, metadata coding bit-budget fluctuation, robustness in noisy channel, and error propagation due to lost frames.

Figure 7:
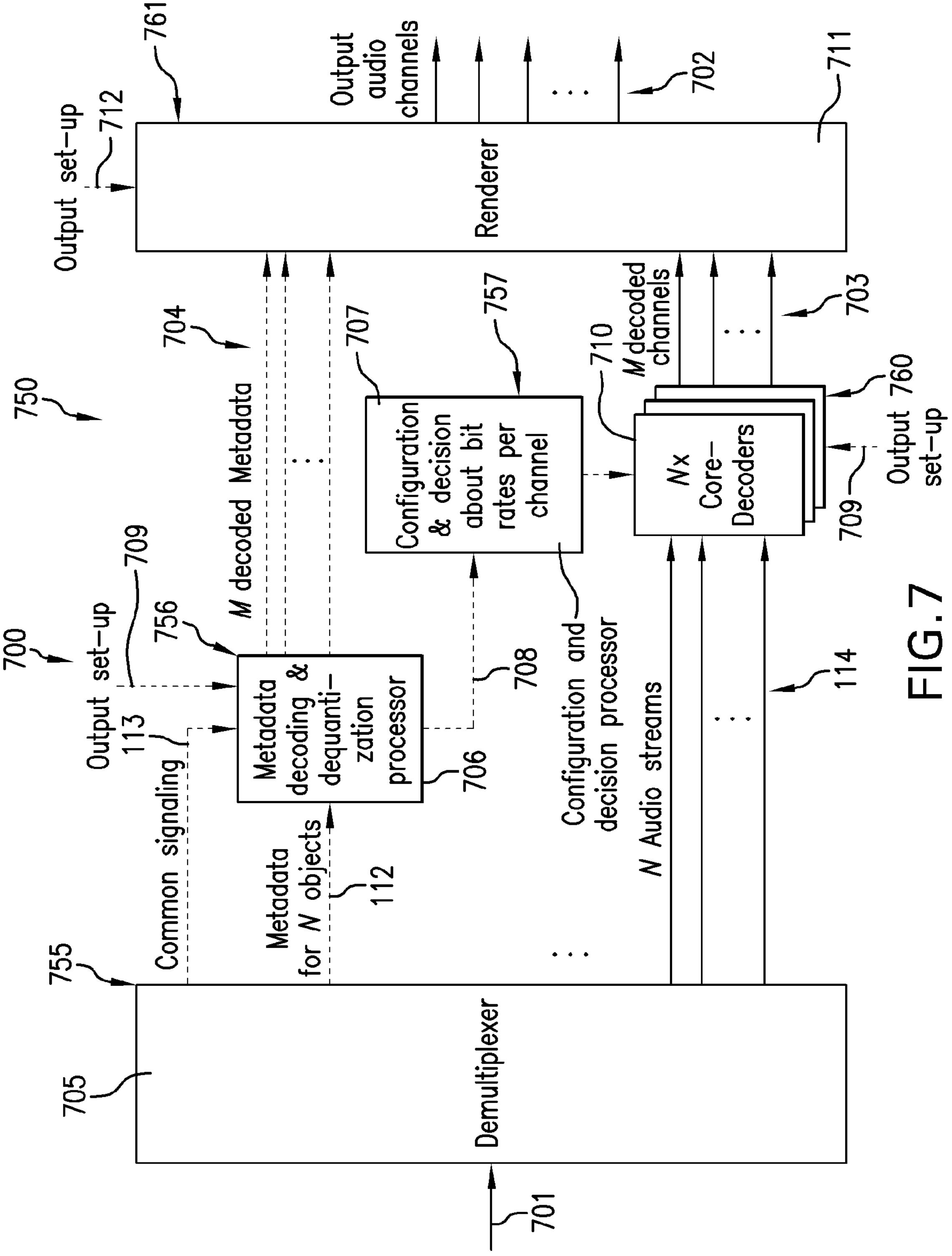
FIG. 7 is a schematic block diagram illustrating concurrently the system for decoding audio objects in response to audio streams with associated metadata and the corresponding method for decoding the audio objects.

The quantized and coded metadata 112 from the metadata processor 105 are supplied to a multiplexer 110 for insertion into an output bit-stream 111 transmitted to a distant decoder 700 (FIG. 7).

Once the metadata of the N audio objects are analyzed, quantized and encoded, information 107 from the metadata processor 105 about the bit-budget for the coding of the metadata per audio object is supplied to a configuration and decision processor 106 (bit-budget allocator) described in more detail in the following section 2.4. When the configuration and bitrate distribution between the audio streams is completed in processor 106 (bit-budget allocator), the coding continues with further pre-processing 158 to be described later. Finally, the N audio streams are encoded using an encoder comprising, for example, N fluctuating bitrate core-encoders 109, such as mono core-encoders.

2.4 Bitrates Per Channel Configuration and Decision

The method 150 of FIG. 1, for coding the object-based audio signal comprises an operation 156 of configuration and decision about bitrates per transport channel 104. To perform the operation 156, the system 100 for coding the object-based audio signal comprises the configuration and decision processor 106 forming a bit-budget allocator.

The configuration and decision processor 106 (herein after bit-budget allocator 106) uses a bitrate adaptation algorithm to distribute the available bit-budget for core-encoding the N audio streams in the N transport channels 104.

The bitrate adaptation algorithm of the configuration and decision operation 156 comprises the following sub-operations 1-6 performed by the bit-budget allocator 106:

1. The ISm total bit-budget, $\text{bits}_{ism}$, per frame is calculated from the ISm total bitrate_ism_total_brate (or the codec total bitrate codec_total_brate if only audio objects are coded) using, for example, the following relation:

$$bits_{ism} = \frac{\text{ism\_total\_brate}}{50}$$

The denominator, 50, corresponds to the number of frames per second, assuming 20-ms long frames. The value 50 would be different if the size of the frame is different from 20 ms.

2. The above defined element bitrate element_brate (resulting from a sum of the metadata bit-budget and core-encoder bit-budget related to one audio object) defined for N audio objects is supposed to be constant during a session at a given codec total bitrate, and about the same for the N audio objects. A "session" is defined for example as a phone call or an off-line compression of an audio file. The corresponding element bit-budget, $\text{bits}_{element}$, is computed for the audio streams objects n=0, . . . , N−1 using, for example, the following relation:

$$bits_{element}[n] = \left\lfloor \frac{bits_{ism}}{N} \right\rfloor$$

where $\lfloor x \rfloor$ indicates the largest integer smaller than or equal to x. In order to spend all available ISm total bit-budget $\text{bits}_{ism}$ the element bit-budget $\text{bits}_{element}$ of, for example, the last audio object is eventually adjusted using the following relation:

$$bits_{element}[N-1] = \left\lfloor \frac{bits_{ism}}{N} \right\rfloor + bits_{ism} \bmod N$$

where "mod" indicates a remainder modulo operation. Finally, the element bit-budget $\text{bits}_{element}$ of the N audio objects is used to set the value element_brate for the ausio objects n=0, . . . , N−1 using, for example, the following relation:

$$\text{element brate}[n] = \text{bits}_{element}[n]*50$$

where the number 50, as already mentioned, corresponds to the number of frames per second, assuming 20-ms long frames.

3. The metadata bit-budget $\text{bits}_{meta}$, per frame, of the N audio objects is summed, using the following relation:

$$bits_{meta\_all} = \sum_{n=0}^{N-1} bits_{meta}[n]$$

and the resulting value $\text{bits}_{metal\_all}$ is added to an ISm common signaling bit-budget, $\text{bits}_{Ism\_signalling}$, resulting in the codec side bit-budget:

$$\text{bits}_{side} = \text{bits}_{meta\_all} + \text{bits}_{ISm\_signalling}$$

4. The codec side bit-budget, $\text{bits}_{side}$, per frame, is split equally between the N audio objects and used to compute the core-encoder bit-budget, $\text{bits}_{CoreCoder}$, for each of the N audio streams using, for example, the following relation:

$$bits_{CoreCoder}[n] = bits_{element}[n] - \left\lfloor \frac{bits_{side}}{N} \right\rfloor$$

while the core-encoder bit-budget of, for example, the last audio stream may eventually be adjusted to spend all the available core-encoding bit-budget using, for example, the following relation:

$$bits_{CodeCoder}[N-1] = bits_{element}[N-1] - \left\lfloor \frac{bits_{side}}{N} \right\rfloor + bits_{side} \bmod N$$

The corresponding total bitrate, total brate, i.e. the bitrate to code one audio stream, in a core-encoder, is then obtained for n=0, . . . , N−1 using, for example, the following relation:

$$\text{total\_brate}[n] = \text{bits}_{CoreCoder}[n]*50$$

where the number 50, again, corresponds to the number of frames per second, assuming 20-ms long frames.

5. The total bitrate, total_brate, in inactive frames (or in frames with very low energy or otherwise without meaningful content) may be lowered and set to a constant value in the related audio streams. The so saved bit-budget is then redistributed equally between the audio streams with active content in the frame. Such redistribution of bit-budget will be further described in the following section 2.4.1.

6. The total bitrate, total brate, in audio streams (with active content) in active frames is further adjusted between these audio streams based on an ISm importance classification. Such adjustment of bitrate will be further described in the following section 2.4.2.

When the audio streams are all in an inactive segment (or are without meaningful content), the above last two sub-operations 5 and 6 may be skipped. Accordingly, the bitrate adaptation algorithms described in following sections 2.4.1 and 2.4.2 are employed when at least one audio stream has active content.

2.4.1 Bitrate Adaptation Based on Signal Activity

In inactive frames (VAD=0), the total bitrate, total brate, is lowered and the saved bit-budget is redistributed, for example equally between the audio streams in active frames (VAD≠0). The assumption is that waveform coding of an audio stream in frames which are classified as inactive is not required; the audio object may be muted. The logic, used in every frame, can be expressed by the following sub-operations 1-3:

1. For a particular frame, set a lower core-encoder bit-budget to every audio stream n with inactive content:

$$\text{bits}_{CoreCoder}'[n]=B_{VAD0}\ \forall n \text{ with VAD=0}$$

where $B_{VAD0}$ is a lower, constant core-encoder bit-budget to be set in inactive frames; for example $B_{VAD0}$=140 (corresponding to 7 kbps for a 20 ms frame) or $B_{VAD0}$=49 (corresponding to 2.45 kbps for a 20 ms frame).

2. Next, the saved bit-budget is computed using, for example, the following relation:

$$bits_{diff}=\sum_{n=0}^{N-1}(bits'_{CoreCoder}[n]-bits_{CoreCoder}[n])$$

3. Finally, the saved bit-budget is redistributed, for example equally between the core-encoder bit-budgets of the audio streams with active content in a given frame using the following relation:

$$bits'_{CoreCoder}[n]=bits_{CoreCoder}[n]+\left\lfloor\frac{bits_{diff}}{N_{VAD1}}\right\rfloor$$
$$\forall\ n \text{ with } VAD=1$$

where $N_{VAD1}$ is the number of audio streams with active content. The core-encoder bit-budget of the first audio stream with active content is eventually increased using, for example, the following relation:

$$bits'_{CoreCoder}[n]=bits_{CoreCoder}[n]+\left\lfloor\frac{bits_{diff}}{N_{VAD1}}\right\rfloor+bits_{diff}\bmod N_{VAD1},$$
$$\forall\ n\ \square \text{ first } VAD=1 \text{ stream}$$

The corresponding core-encoder total bitrate, total brate, is finally obtained for each audio stream n=0, . . . , N−1 as follows:

$$\text{total\_brate}'[n]=\text{bits}_{CoreCoder}'[n]*50$$

Figure 4:
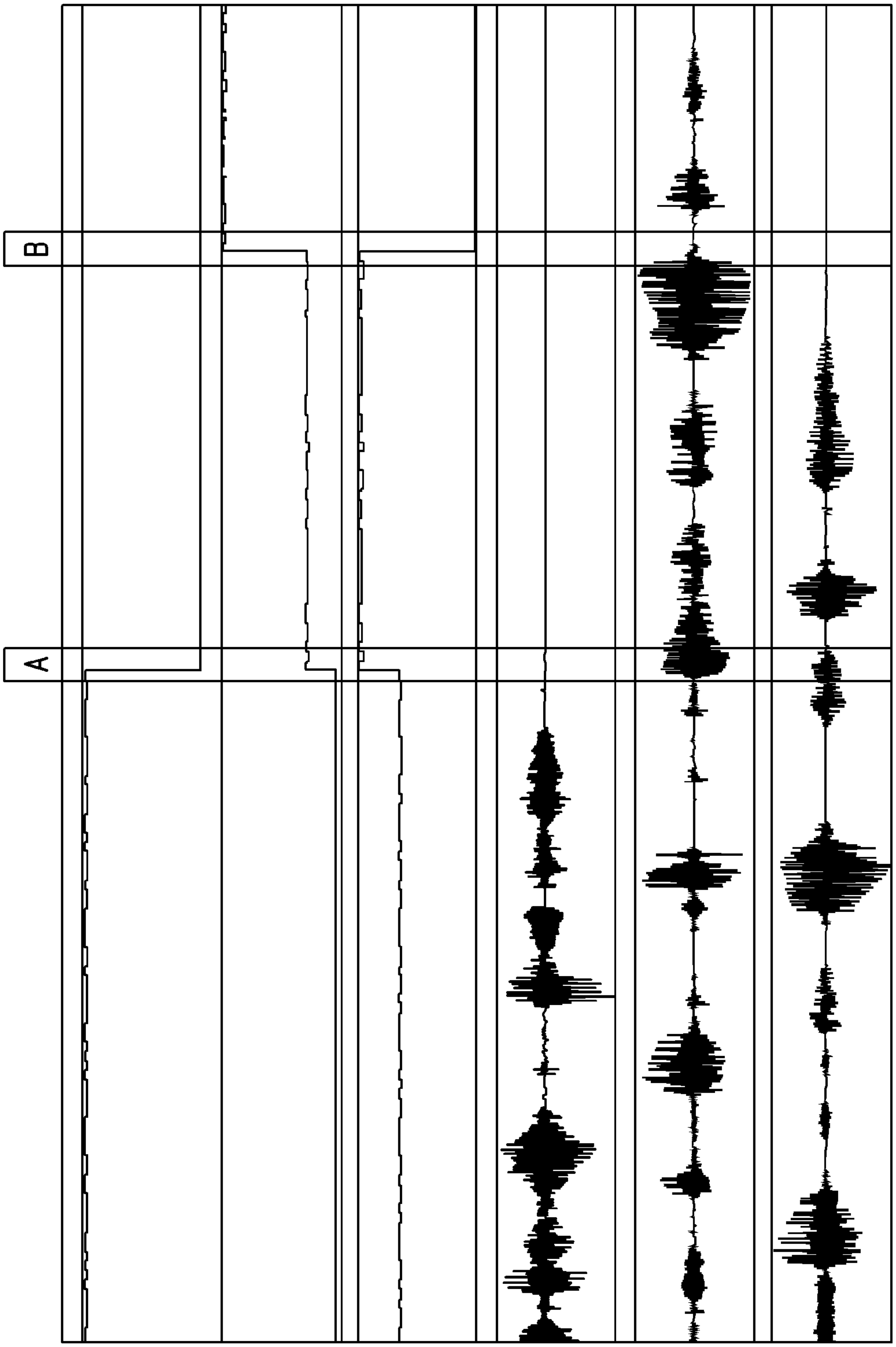
FIG. 4 is a graph illustrating an example of bitrate adaptation for three (3) core-encoders.

FIG. 4 is a graph illustrating an example of bitrate adaptation for three (3) core-encoders. Specifically, In FIG. 4, the first line shows the core-encoder total bitrate, total_brate, for audio stream #1, the second line shows the core-encoder total bitrate, total_brate, for audio stream #2, the third line shows the core-encoder total bitrate, total_brate, for audio stream #3, line 4 is the audio stream #1, line 5 is the audio stream #2, and line 4 is the audio stream #3.

In the example of FIG. 4, the adaptation of the total bitrate, total brate, for the three (3) core-encoder is based on VAD activity (active/inactive frames). As can be seen from FIG. 4, most of the time there is a small fluctuation of the core-encoder total bitrate, total_brate, as a result of the fluctuating side bit-budget $\text{bits}_{side}$. Then, there are infrequent substantial changes of the core-encoder total bitrate, total brate, as a result of the VAD activity.

For example, referring to FIG. 4, instance A) corresponds to a frame where the audio stream #1 VAD activity changes from 1 (active) to 0 (inactive). According to the logic, a minimum core-encoder total bitrate, total_brate, is assigned to audio object #1 while the core-encoder total bitrates, total_brate, for active audio objects #2 and #3 are increased. Instance B) corresponds to a frame where the VAD activity of the audio stream #3 changes from 1 (active) to 0 (inactive) while the VAD activity of the audio stream #1 remains to 0. Accordingly to the logic, a minimum core-encoder total bitrate, total_brate, is assigned to audio streams #1 and #3 while the core-encoder total bitrate, total_brate, of the active audio stream #2 is further increased.

The above logic of section 2.4.1 can be made dependent from the total bitrate ism_total_brate. For example, the bit-budget $B_{VAD0}$ in the above sub-operation 1 can be set higher for a higher total bitrate ism_total_brate, and lower for a lower total bitrate ism_total_brate.

2.4.2 Bitrate Adaptation Based on ISm Importance

The logic described in previous section 2.4.1 results in about a same core-encoder bitrate in every audio stream with active content (VAD=1) in a given frame. However, it may be beneficial to introduce an inter-object core-encoder bitrate adaptation based on a classification of ISm importance (or, more generally, on a metric indicative of how critical coding of a particular audio object in a current frame to obtain a given (decent) quality of the decoded synthesis is).

The classification of ISm importance can be based on several parameters and/or combination of parameters, for example core-encoder type (coder_type), FEC (Forward Error Correction), sound signal classification (class), speech/music classification decision, and/or SNR (Signal-to-Noise Ratio) estimate from the open-loop ACELP/TCX (Algebraic Code-Excited Linear Prediction/Transform-Coded eXcitation) core decision module (snr_celp, snr_tcx) as described in Reference [1]. Other parameters can possibly be used for determining the classification of ISm importance.

In a non-restrictive example, a simple classification of ISm importance is based on the core-encoder type as defined in Reference [1] is implemented. For that purpose, the bit-budget allocator 106 of FIG. 1 comprises a classifier (not shown) for rating the importance of a particular ISm stream. As a result, four (4) distinct ISm importance classes, $\text{class}_{ISm}$, are defined:

No metadata class, ISM_NO_META: frames without metadata coding, e.g. inactive frames with VAD=0;

Low importance class, ISM_LOW_IMP: frames where coder_type=UNVOICED or INACTIVE;

Medium importance class, ISM_MEDIUM_IMP: frames where coder type=VOICED;

High importance class ISM_HIGH_IMP: frames where coder type=GENERIC.

The ISm importance class is then used by the bit-budget allocator 106, in the bitrate adaptation algorithm (See above Section 2.4, sub-operation 6) to assign a higher bit-budget to audio streams with a higher ISm importance and a lower bit-budget to audio streams with a lower ISm importance. Thus for every audio stream n, n=0, . . . , N−1, the following bitrate adaptation algorithm is used by the bit-budget allocator 106:

1. In frames classified as $class_{ISm}$=ISM_NO_META, the constant low bitrate $B_{VAD0}$ is assigned.
2. In frames classified as $class_{ISm}$=ISM_LOW_IMP, the total bitrate, total brate, is lowered for example as:

$$total\_brate_{new}[n]=\max(\alpha_{low}*total\_brate[n],B_{low})$$

where the constant $\alpha_{low}$ is set to a value lower than 1.0, for example 0.6. Then the constant $B_{low}$ represents a minimum bitrate threshold supported by the codec for a particular configuration, which may be dependent upon, for example, the internal sampling rate of the codec, the coded audio bandwidth, etc. (See Reference [1] for more detail about these values).

3. In frames classified as $class_{ISm}$=ISM_MEDIUM_IMP: the core-encoder total bitrate, total_brate, is lowered for example as $$total\_brate_{new}[n]=\max(\alpha_{med}*total\_brate[n],B_{low})$$

where the constant $\alpha_{med}$ is set to a value lower than 1.0 but higher than $\alpha_{low}$, for example to 0.8.

4. In frames classified as $class_{ISm}$=ISM_HIGH_IMP, no bitrate adaptation is used;
5. Finally, the saved bit-budget (a sum of differences between the old (total_brate) and new ($total\_brate_{new}$) total bitrates) is redistributed equally between the audio streams with active content in the frame. The same bit-budget redistribution logic as described in section 2.4.1, sub-operations 2 and 3, may be used.

Figure 5:
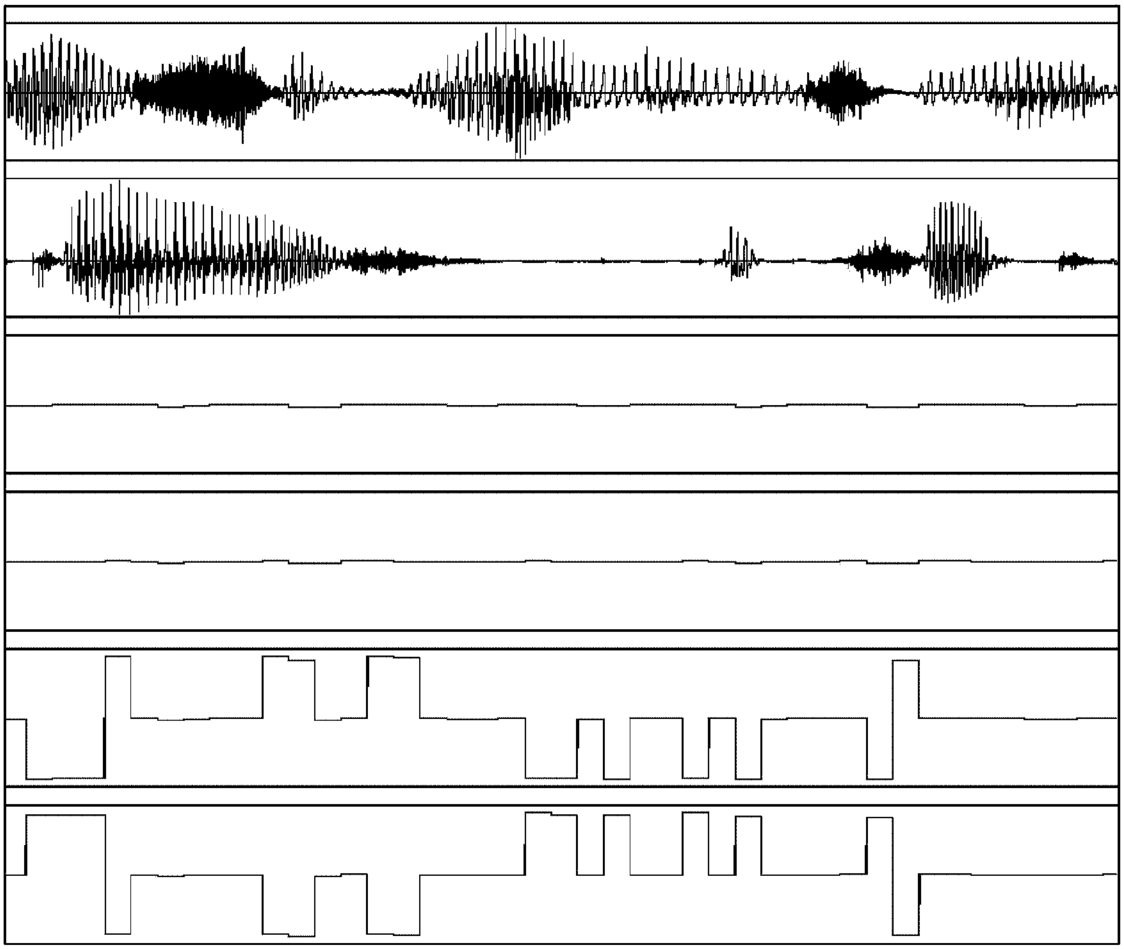
FIG. 5 is a graph illustrating an example of bitrate adaptation based on an ISm (Independent audio stream with metadata) importance logic.

FIG. 5 is a graph illustrating an example of bitrate adaptation based on ISm importance logic. From top to bottom, the graph of FIG. 5 illustrates, in time:

An active speech segment of the audio stream for audio object #1;

An active speech segment of the audio stream for audio object #2;

The total bitrate, total_brate, of the audio stream for audio object #1 without using the bitrate adaptation algorithm;

The total bitrate, total_brate, of the audio stream for audio object #2 without using the bitrate adaptation algorithm;

The total bitrate, total_brate, of the audio stream for audio object #1 when the bitrate adaptation algorithm is used; and The total bitrate, total_brate, of the audio stream for audio object #2 when the bitrate adaptation algorithm is used.

In the non-limitative example of FIG. 5, with two audio objects (N=2) and a fixed constant total bitrate, ism_total_brate, equal to 48 kbps, the core-encoder total bitrate, total_brate, in active frames of audio object #1 fluctuates between 23.45 kbps and 23.65 kbps when the bitrate adaptation algorithm is not used while it fluctuates between 19.15 kbps and 28.05 kbps when the bitrate adaptation algorithm is used. Similarly, the core-encoder total bitrate, total brate, in active frames of audio object #2 fluctuates between 23.40 kbps and 23.65 kbps without using the bitrate adaptation algorithm and between 19.10 kbps and 28.05 kbps with the bitrate adaptation algorithm. A better, more efficient distribution of the available bit-budget between the audio streams is thereby obtained.

2.5 Pre-Processing

Referring to FIG. 1, the method 150 for coding the object-based audio signal comprises an operation of pre-processing 158 of the N audio streams conveyed through the N transport channels 104 from the configuration and decision processor 106 (bit-budget allocator). To perform the operation 158, the system 100 for coding the object-based audio signal comprises a pre-processor 108.

Once the configuration and bitrate distribution between the N audio streams is completed by the configuration and decision processor 106 (bit-budget allocator), the pre-processor 108 performs sequential further pre-processing 158 on each of the N audio streams. Such pre-processing 158 may comprise, for example, further signal classification, further core-encoder selection (for example selection between ACELP core, TCX core, and HQ core), other resampling at a different internal sampling frequency $F_s$ adapted to the bitrate to be used for core-encoding, etc. Examples of such pre-processing can be found, for example, in Reference [1] in relation to the EVS codec and, therefore, will not be further described in the present disclosure.

2.6 Core-Encoding

Referring to FIG. 1, the method 150 for coding the object-based audio signal comprises an operation of core-encoding 159. To perform the operation 159, the system 100 for coding the object-based audio signal comprises the above mentioned encoder of the N audio streams including, for example, a number N of core-encoders 109 to respectively code the N audio streams conveyed through the N transport channels 104 from the pre-processor 108.

Specifically, the N audio streams are encoded using N fluctuating bitrate core-encoders 109, for example mono core-encoders. The bitrate used by each of the N core-encoders is the bitrate selected by the configuration and decision processor 106 (bit-budget allocator) for the corresponding audio stream. For example, core-encoders as described in Reference [1] can be used as core-encoders 109.

3.0 Bit-Stream Structure

Referring to FIG. 1, the method 150 for coding the object-based audio signal comprises an operation of multiplexing 160. To perform the operation 160, the system 100 for coding the object-based audio signal comprises a multiplexer 110.

Figure 6:
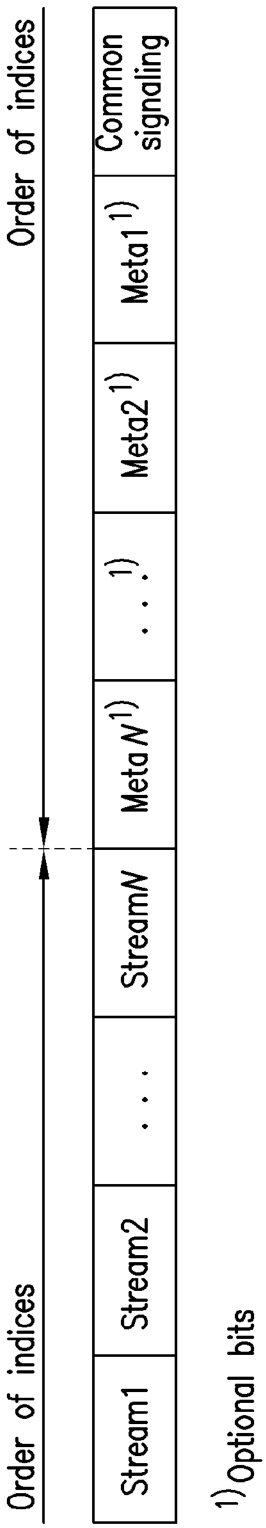
FIG. 6 is a schematic diagram illustrating the structure of a bit-stream transmitted from the coding system of FIG. 1 to the decoding system of FIG. 7.

FIG. 6 is a schematic diagram illustrating, for a frame, the structure of the bit-stream 111 produced by the multiplexer 110 and transmitted from the coding system 100 of FIG. 1 to the decoding system 700 of FIG. 7. Regardless whether metadata are present and transmitted or not, the structure of the bit-stream 111 may be structured as illustrated in FIG. 6.

Referring to FIG. 6, the multiplexer 110 writes the indices of the N audio streams from the beginning of the bit-stream 111 while the indices of ISm common signaling 113 from the configuration and decision processor 106 (bit-budget allocator) and metadata 112 from the metadata processor 105 are written from the end of the bit-stream 111.

3.1 ISm Common Signaling

The multiplexer writes the ISm common signaling 113 from the end of the bit-stream 111. The ISm common signaling is produced by the configuration and decision processor 106 (bit-budget allocator) and comprises a variable number of bits representing:

(a) a number N of audio objects: the signaling for the number N of coded audio objects present in the bit-stream 111 is in the form of, for example, a unary code with a stop bit (e.g. for N=3 audio objects, the first 3 bits of the ISm common signaling would be "110").

(b) a metadata presence flag, $flag_{meta}$: The flag, $flag_{meta}$, is present when the bitrate adaptation based on signal activity as described in section 2.4.1 is used and comprises one bit per audio object to indicate whether metadata for that particular audio object are present ($flag_{meta}$=1) or not ($flag_{meta}$=0) in the bit-stream 111, or (c) the ISm importance class: this signaling is present when the bitrate adaptation based on the ISM importance as described in section 2.4.2 is used and comprises two bits per audio object to indicate the ISm importance class, $class_{ISm}$ (ISM_NO_META, ISM_LOW_IMP, ISM_MEDIUM_IMP, and ISM_HIGH_IMP), as defined in section 2.4.2.

(d) an ISm VAD flag, $flag_{VAD}$: the ISm VAD flag is transmitted when $flag_{meta}$=0, respectively $class_{ISm}$=ISM_NO_META, and distinguishes between the following two cases:

1) input metadata are not present or metadata are not coded so that the audio stream needs to be coded by an active coding mode ($flag_{VAD}$=1); and
2) input metadata are present and transmitted so that the audio stream can be coded by an inactive coding mode ($flag_{VAD}$=0).

3.2 Coded Metadata Payload

The multiplexer 110 is supplied with the coded metadata 112 from the metadata processor 105 and writes the metadata payload sequentially from the end of the bit-stream for the audio objects for which the metadata are coded ($flag_{meta}$=1, respectively $class_{ISm}$≠ISM_NO_META) in the current frame. The metadata bit-budget for each audio object is not constant but rather inter-object and inter-frame adaptive. Different metadata format scenarios are shown in FIG. 2.

In the case that metadata are not present or are not transmitted for at least some of the N audio objects, the metadata flag is set to 0, i.e. $flag_{meta}$=0, respectively $class_{ISm}$=ISM_NO_META, for these audio objects. Then, no metadata indices are sent in relation to those audio objects, i.e. $bits_{meta}$[n]=0.

3.3 Audio Streams Payload

The multiplexer 110 receives the N audio streams 114 coded by the N core encoders 109 through the N transport channels 104, and writes the audio streams payload sequentially for the N audio streams in chronological order from the beginning of the bit-stream 111 (See FIG. 6). The respective bit-budgets of the N audio streams are fluctuating as a result of the bitrate adaptation algorithm described in section 2.4.

4.0 Decoding of Audio Objects

FIG. 7 is a schematic block diagram illustrating concurrently the system 700 for decoding audio objects in response to audio streams with associated metadata and the corresponding method 750 for decoding the audio objects.

4.1 Demultiplexing

Referring to FIG. 7, the method 750 for decoding audio objects in response to audio streams with associated metadata comprises an operation of demultiplexing 755. To perform the operation 755, the system 700 for decoding audio objects in response to audio streams with associated metadata comprises a demultiplexer 705.

The demultiplexer receive a bit-stream 701 transmitted from the coding system 100 of FIG. 1 to the decoding system 700 of FIG. 7. Specifically, the bit-stream 701 of FIG. 7 corresponds to the bit-stream 111 of FIG. 1.

The demultiplexer 110 extracts from the bit-stream 701 (a) the coded N audio streams 114, (b) the coded metadata 112 for the N audio objects, and (c) the ISm common signaling 113 read from the end of the received bit-stream 701.

4.2 Metadata Decoding and Dequantization

Referring to FIG. 7, the method 750 for decoding audio objects in response to audio streams with associated metadata comprises an operation 756 of metadata decoding and dequantization. To perform the operation 756, the system 700 for decoding audio objects in response to audio streams with associated metadata comprises a metadata decoding and dequantization processor 706.

The metadata decoding and dequantization processor 706 is supplied with the coded metadata 112 for the transmitted audio objects, the ISm common signaling 113, and an output set-up 709 to decode and dequantize the metadata for the audio streams/objects with active contents. The output set-up 709 is a command line parameter about the number M of decoded audio objects/transport channels and/or audio formats, which can be equal to or different from the number N of coded audio objects/transport channels. The metadata decoding and de-quantization processor 706 produces decoded metadata 704 for the M audio objects/transport channels, and supplies information about the respective bit-budgets for the M decoded metadata on line 708. Obviously, the decoding and dequantization performed by the processor 706 is the inverse of the quantization and coding performed by the metadata processor 105 of FIG. 1.

4.3 Configuration and Decision About Bitrates

Referring to FIG. 7, the method 750 for decoding audio objects in response to audio streams with associated metadata comprises an operation 757 of configuration and decision about bitrates per channel. To perform the operation 757, the system 700 for decoding audio objects in response to audio streams with associated metadata comprises a configuration and decision processor 707 (bit-budget allocator).

The bit-budget allocator 707 receives (a) the information about the respective bit-budgets for the M decoded metadata on line 708 and (b) the ISm importance class, $class_{ISm}$, from the common signaling 113, and determine the core-decoder bitrates per audio stream, total_brate[n]. The bit-budget allocator 707 uses the same procedure as in the bit-budget allocator 106 of FIG. 1 to determine the core-decoder bitrates (see section 2.4).

4.4 Core-Decoding

Referring to FIG. 7, the method 750 for decoding audio objects in response to audio streams with associated metadata comprises an operation of core-decoding 760. To perform the operation 760, the system 700 for decoding audio objects in response to audio streams with associated metadata comprises a decoder of the N audio streams 114 including a number N of core-decoders 710, for example N fluctuating bitrate core-decoders.

The N audio streams 114 from the demultiplexer 705 are decoded, for example sequentially decoded in the number N of fluctuating bitrate core decoders 710 at their respective core-decoder bitrates as determined by the bit-budget allocator 707. When the number of decoded audio objects, M, as requested by the output set-up 709 is lower than the number of transport channels, i.e M<N, a lower number of core-decoders are used. Similarly, not all metadata payloads may be decoded in such a case.

In response to the N audio streams 114 from the demultiplexer 705, the core-decoder bitrates as determined by the bit-budget allocator 707, and the output set-up 709, the core-decoders 710 produces a number M of decoded audio streams 703 on respective M transport channels.

5.0 Audio Channel Rendering

In an operation of audio channel rendering 761, a renderer 711 of audio objects transforms the M decoded metadata 704 and the M decoded audio streams 703 into a number of output audio channels 702, taking into consideration an output set-up 712 indicative of the number and contents of output audio channels to be produced. Again, the number of output audio channels 702 may be equal to or different from the number M.

The renderer 761 may be designed in a variety of different structures to obtain the desired output audio channels. For that reason, the renderer will not be further described in the present disclosure.

6.0 Source Code

According to a non-limitative illustrative embodiment, the system and method for coding an object-based audio signal as disclosed in the foregoing description may be implemented by the following source code (expressed in C-code) given herein below as additional disclosure.

```
void ism_metadata_enc(
    const long ism_total_brate,              /* i : ISms total bitrate           */
    const short n_ISms,                      /* i : number of objects            */
    ISM_METADATA_HANDLE hIsmMeta[ ],         /* i/o: ISM metadata handles        */
    ENC_HANDLE hSCE[ ],                      /* i/o: element encoder handles     */
    BSTR_ENC_HANDLE hBstr,                   /* i/o: bitstream handle            */
    short nb_bits_metadata[ ],               /* o : number of metadata bits      */
    short localVAD[ ]
)
{
    short i, ch, nb_bits_start, diff;
    short idx_azimuth, idx_azimuth_abs, flag_abs_azimuth[MAX_NUM_OBJECTS],
nbits_diff_azimuth;
    short idx_elevation, idx_elevation_abs, flag_abs_elevation[MAX_NUM_OBJECTS],
nbits_diff_elevation;
    float valQ;
    ISM_METADATA_HANDLE hIsmMetaData;
    long element_brate[MAX_NUM_OBJECTS], total_brate[MAX_NUM_OBJECTS];
    short ism_metadata_flag_global;
    short ism_imp[MAX_NUM_OBJECTS];
    /* initialization */
    ism_metadata_flag_global = 0;
    set_s( nb_bits_metadata, 0, n_ISms );
    set_s( flag_abs_azimuth, 0, n_ISms );
    set_s( flag_abs_eleyation, 0, n_ISms );
    /*----------------------------------------------------------------*
     * Set Metadata presence / importance flag
     *----------------------------------------------------------------*/
    for( ch = 0; ch < n_ISms; ch++ )
    {
        if( hIsmMeta[ch]->ism_metadata_flag )
        {
            hIsmMeta[ch]->ism_metadata_flag = localVAD[ch];
        }
        else
        {
            hIsmMeta[ch]->ism_metadata_flag = 0;
        }
        if ( hsCE[ch]->hCoreCoder[0]->tcxonly )
        {
            /* at highest bitrate (with TCX core only) metadata are sent in every frame
*/
            hIsmMeta[ch]->ism_metadata_flag = 1;
        }
    }
    rate_ism_importance( n_ISms, hIsmMeta, hSCE, ism_imp );
    /*----------------------------------------------------------------*
     * Write ISm common signalling
     *----------------------------------------------------------------*/
    /* write number of objects - unary coding */
    for( ch = 1; ch < n_ISms; ch++ )
    {
        push_indice( hBstr, IND_ISM_NUM_OBJECTS, 1, 1 );
    }
    push_indice( hBstr, IND_ISM_NUM_OBJECTS, 0, 1 );
    /* write ISm metadata flag (one per object) */
    for( ch = 0; ch < n_ISms; ch++ )
    {
        push_indice( hBstr, IND_ISM_METADATA_FLAG, ism_imp[ch], ISM_METADATA_FLAG_BITS );
        ism_metadata_flag_global |= hIsmMeta[ch]->ism_metadata_flag;
    }
    /* write VAD flag */
    for( ch = 0; ch < n_ISms; ch++ )
    {
```

-continued

```
            if( hIsmMeta[ch]->ism_metadata_flag == 0 )
            {
                push_indice( hBstr, IND_ISM_VAD_FLAG, localVAD[ch], VAD_FLAG_BITS );
            }
        }
        if( ism_metadata_flag_global )
        {
            /*----------------------------------------------------------------*
             * Metadata quantization and coding, loop over all objects
             *----------------------------------------------------------------*/
            for( ch = 0; ch < n_ISms; ch++ )
            {
                hIsmMetaData = hIsmMeta[ch];
                nb_bits_start = hBstr->nb_bits_tot;
                if( hIsmMeta[ch]->ism_metadata_flag )
                {
                    /*----------------------------------------------------------------*
                     * Azimuth quantization and encoding
                     *----------------------------------------------------------------*/
                     /* Azimuth quantization */
                    idx_azimuth_abs = usquant( hIsmMetaData->azimuth, &valQ, ISM_AZIMUTH_MIN,
ISM_AZIMUTH_DELTA, (1 << ISM_AZIMUTH_NBITS) );
                    idx_azimuth = idx_azimuth_abs;
                    nbits_diff_azimuth = 0;
                    flag_abs_azimuth[ch] = 0; /* differential coding by default */
                    if( hIsmMetaData->azimuth_diff_cnt == ISM_FEC_MAX    /* make differential
encoding in ISM_FEC_MAX consecutive frames at maximum (in order to control the decoding
in FEC) */
                        | | hIsmMetaData->last_ism_metadata_flag == 0    /* If last frame had
no metadata coded, do not use differential coding */
                        )
                    {
                        flag_abs_azimuth[ch] = 1;
                    }
                    /* try differential coding */
                    if( flag_abs_azimuth[ch] == 0 )
                    {
                        diff = idx_azimuth_abs - hIsmMetaData->last_azimuth_idx;
                        if( diff == 0 )
                        {
                            idx_azimuth = 0;
                            nbits_diff_azimuth = 1;
                        }
                        else if( ABSVAL( diff ) < ISM_MAX_AZIMUTH_DIFF_IDX )    /* when diff
bits >= abs bits, prefer abs */
                        {
                            idx_azimuth = 1 << 1;
                            nbits_diff_azimuth = 1;
                            if( diff < 0 )
                            {
                                idx_azimuth +=    1; /* negative sign */
                                diff *= -1;
                            }
                            else
                            {
                                idx_azimuth +=    0; /* positive sign */
                            }
                            idx_azimuth = idx_azimuth << diff;
                            nbits_diff_azimuth++;
                            /* unary coding of "diff */
                            idx_azimuth += ((1<<diff) - 1);
                            nbits_diff_azimuth += diff;
                            if( nbits_diff_azimuth < ISM_AZIMUTH_NBITS - 1 )
                            {
                                /* add stop bit - only for codewords shorter than
ISM_AZIMUTH_NBITS */
                                idx_azimuth = idx_azimuth << 1;
                                nbits_diff_azimuth++;
                            }
                        }
                        else
                        {
                            flag_abs_azimuth[ch] = 1;
                        }
                    }
                    /* update counter */
                    if( flag_abs_azimuth[ch] == 0 )
                    {
                        hIsmMetaData->azimuth_diff_cnt++;
```

```
                hIsmMetaData->elevation_diff_cnt = min( hIsmMetaData-
>elevation_diff_cnt, ISM_FEC_MAX );
            }
            else
            {
                hIsmMetaData->azimuth_diff_cnt = 0;
            }
            /* Write azimuth */
            push_indice( hBstr, IND_ISM_AZIMUTH_DIFF_FLAG, flag_abs_azimuth[ch], 1 );
            if( flag_abs_azimuth[ch] )
            {
                push_indice( hBstr, IND_ISM_AZIMUTH, idx_azimuth, ISM_AZIMUTH_NBITS
);
            }
            else
            {
                push_indice( hBstr, IND_ISM_AZIMUTH, idx_azimuth, nbits_diff_azimuth
);
            }
            /*----------------------------------------------------------------*
             * Elevation quantization and encoding
             *----------------------------------------------------------------*/
             /* Elevation quantization */
            idx_elevation_abs = usquant( hIsmMetaData->elevation, &valQ,
ISM_ELEVATION_MIN, ISM_ELEVATION_DELTA, (1 << ISM_ELEVATION_NBITS) );
            idx_elevation = idx_elevation_abs;
            nbits_diff_elevation = 0;
            flag_abs_elevation[ch] = 0; /* differential coding by default */
            if( hIsmMetaData->elevation_diff_cnt == ISM_FEC_MAX      /* make
differential encoding in ISM_FEC_MAX consecutive frames at maximum (in order to control
the decoding in FEC) */
                | | hIsmMetaData->last_ism_metadata_flag ==          0 /* If last frame
had no metadata coded, do not use differential coding */
                )
            {
                flag_abs_elevation[ch] = 1;
            }
            /* note: elevation is coded starting from the second frame only (it is
meaningless in the init_frame) */
            if( hSCE[0]->hCoreCoder[0]->ini_frame == 0 )
            {
                flag_abs_elevation[ch] = 1;
                hIsmMetaData->last_elevation_idx = idx_elevation_abs;
            }
            diff = idx_elevation_abs - hIsmMetaData->last_elevation_idx;
            /* avoid absolute coding of elevation if absolute coding was already used
for azimuth */
            if( flag_abs_azimuth[ch] == 1 )
            {
                flag_abs_elevation[ch] = 0;
                if( diff >= 0 )
                {
                    diff == min( diff, ISM_MAX_ELEVATION_DIFF_IDX );
                }
                else
                {
                    diff = -1 * min( -diff, ISM_MAX_ELEVATION_DIFF_IDX    );
                }
            }
            /* try differential coding */
            if( flag_abs_elevation[ch] == 0 )
            {
                if( diff == 0 )
                {
                    idx_elevation = 0;
                    nbits_diff_elevation = 1;
                }
                else if( ABSVAL( diff ) < ISM_MAX_ELEVATION_DIFF_IDX )    /* when diff
bits >= abs bits, prefer abs */
                {
                    idx_elevation = 1 << 1;
                    nbits_diff_elevation = 1;
                    if( diff < 0 )
                    {
                        idx_elevation += 1;    /* negative sign */
                        diff *= -1;
                    }
```

-continued

```
                        else
                        {
                            idx_elevation +=    0; /* positive sign */
                        }
                        idx_elevation - idx_elevation << diff;
                        nbits_diff_elevation++;
                        /* unary coding of "diff */
                        idx_elevation += ((1 << diff) - 1);
                        nbits_diff_elevation += diff;
                        if( nbits_diff_elevation < ISM_ELEVATION_NBITS - 1 )
                        {
                            /* add stop bit */
                            idx_elevation = idx_elevation << 1;
                            nbits_diff_elevation++;
                        }
                    }
                    else
                    {
                        flag_abs_elevation[ch] = 1;
                    }
                }
                /* update counter */
                if( flag_abs_elevation[ch] == 0 )
                {
                    hIsmMetaData->elevation_diff_cnt++;
                    hIsmMetaData->elevation_diff_cnt = min( hIsmMetaData-
>elevation_diff_cnt, ISM_FEC_MAX );
                }
                else
                {
                    hIsmMetaData->elevation_diff_cnt = 0;
                }
                /* Write elevation */
                if( flag_abs_azimuth[ch] == 0 )      /* do not write "flag_abs_elevation"
if "flag_abs_azimuth == 1" */    /* VE: TBV for VAD 0->1 */
                {
                    push_indice( hBstr, IND_ISM_ELEVATION_DIFF_FLAG,
flag_abs_elevation[ch], 1 );
                }
                if( flag_abs_elevation[ch] )
                {
                    push_indice( hBstr, IND_ISM_ELEVATION, idx_elevation,
ISM_ELEVATION_NBITS );
                }
                else
                {
                    push_indice( hBstr, IND_ISM_ELEVATION, idx_elevation,
nbits_diff_elevation );
                }
                /*----------------------------------------------------------------*
                 * Updates
                 *----------------------------------------------------------------*/
                hIsmMetaData->last_azimuth_idx = idx_azimuth_abs;
                hIsmMetaData->last_elevation_idx = idx_elevation_abs;
                /* save number of metadata bits written */
                nb_bits_metadata[ch] = hBstr->nb_bits_tot - nb_bits_start;
            }
        }
    /*----------------------------------------------------------------*
     * inter-object logic minimizing the use of several absolutely coded
     * indexes in the same frame
     *----------------------------------------------------------------*/
    i = 0;
    while( i == 0 | | i < n_ISms / INTER_OBJECT_PARAM_CHECK )
    {
        short num, abs_num, abs_First, abs_next, pos_zero;
        short abs_matrice[INTER_OBJECT_PARAM_CHECK * 2];
        num = min( INTER_OBJECT_PARAM_CHECK, n_ISms - i * INTER_OBJECT_PARAM_CHECK );
        i++;
        set_s( abs_matrice, 0, INTER_OBJECT_PARAM_CHECK * ISM_NUM_PARAM );
        for( ch = 0; ch < num; ch++ )
        {
            if( flag_abs_azimuth[ch] == 1 )
            {
                abs_matrice[ch*ISM_NUM_PARAM] = 1;
            }
```

```
                    if( flag_abs_elevation[ch] == 1 )
                    {
                        abs_matrice[ch*ISM_NUM_PARAM + 1] = 1;
                    }
                }
                abs_num = sum_s( abs_matrice, INTER_OBJECT_PARAM_CHECK * ISM_NUM_PARAM );
                abs_first = 0;
                while( abs_num > 1 )
                {
                    /* find first "1" entry */
                    while( abs_matrice[abs_first] == 0 )
                    {
                        abs_first++;
                    }
                    /* find next "1" entry */
                    abs_next = abs_first + 1;
                    while( abs_matrice[abs_next] == 0 )
                    {
                        abs_next++;
                    }
                    /* find "0" position */
                    pos_zero = 0;
                        while( abs_matrice[pos_zero] == 1 )
                        {
                            pos_zero++;
                        }
                        ch = abs_next / ISM_NUM_PARAM;
                        if( abs_next % ISM_NUM_PARAM == 0 )
                        {
                            hIsmMeta[ch]−>azimuth_diff_cnt = abs_num − 1;
                        }
                        if( abs_next % ISM_NUM_PARAM == 1 )
                        {
                            hIsmMeta[ch]−>elevation_diff_cnt = abs_num − 1;
                            /*hIsmMeta[ch]−>elevation_diff_cnt = min( hIsmMeta[ch]−
>elevation_diff_cnt, ISM_FEC_MAX );*/
                        }
                        abs_first++;
                        abs_num--;
                    }
                }
            }
            /*---------------------------------------------------------------*
             * Configuration and decision about bit rates per channel
             *---------------------------------------------------------------*/
            ism_config( ism_total_brate, n_ISms, hIsmMeta, localVAD, ism_imp, element_brate,
total_brate, nb_bits_metadata );
            for( ch = 0; ch < n_ISms; ch++ )
            {
                hIsmMeta[ch]−>last_ism_metadata_flag = hIsmMeta[ch]−>ism_metadata_flag;
                hSCE[ch]−>hCoreCoder[0]−>low_rate_mode = 0;
                if ( hIsmMeta[ch]−>ism_metadata_flag == 0 && localVAD[ch][0] == 0 &&
ism_metadata_flag_global )
                {
                    hSCE[ch]−>hCoreCoder[0]−>low_rate_mode = 1;
                }
                hSCE[ch]−>element_brate = element_brate[ch];
                hSCE[ch]−>hCoreCoder[0]−>total_brate = total_brate[ch];
                /* write metadata only in active frames */
                if( hSCE[0]−>hCoreCoder[0]−>core_brate > SID_2k40 )
                {
                    reset_indices_enc( hSCE[ch]−>hMetaData, MAX_BITS_METADATA );
                }
            }
            return;
}
void rate_ism_importance(
            const short n_ISms,                    /* i : number of objects          */
            ISM_METADATA_HANDLE hIsmMeta[ ],       /* i/o: ISM metadata handles      */
            ENC_NANDLE hSCE[ ],                    /* i/o: element encoder handles   */
            short ism_imp[ ]                       /* o : ISM importance flags       */
)
{
            short ch, ctype;
            for( ch = 0; ch < n_ISms; ch++ )
            {
                ctype = hSCE[ch]−>hCoreCoder[0]−>coder_type_raw;
                if( hIsmMeta[ch]−>ism_metadata_flag == 0 )
                {
```

```
                ism_imp[ch] = ISM_NO_META;
            }
            else if( ctype == INACTIVE | | ctype == UNVOICED )
            {
                ism_imp[ch] = ISM_LOW_IMP;
            }
            else if( ctype == VOICED )
            {
                ism_imp[ch] = ISM_MEDIUM_IMP;
            }
            else /* GENERIC */
            {
                ism_imp[ch] = ISM_HIGH_IMP;
            }
        }
        return;
}
void ism_config(
        const long ism_total_brate,                    /* i : ISms total bitrate         */
        const short n_ISms,                            /* i : number of objects          */
        ISM_METADATA_NANDLE hIsmMeta[ ],   /* i/o: ISM metadata handles     */
        short localVAD[ ],
        const short ism_imp[ ],                        /* i : ISM importance flags       */
        long element_brate[ ],                         /* o : element bitrate per object  */
        long total_brate[ ],                           /* o : total bitrate per object    */
        short nb_bits_metadata[ ]                      /* i/o: number of metadata bits   */
)
{
        short ch;
        short bits_element[MAX_NUM_OBJECTS], bits_CoreCoder[MAX_NUM_OBJECTS];
        short bits_ism, bits_side;
        long tmpL;
        short ism_metadata_flag_global;
        /* initialization */
        ism_metadata_flag_global = 0;
        bits_side = 0;
        if( hIsmMeta != NULL )
        {
            for( ch = 0; ch < n_ISms; ch++ )
            {
                ism_metadata_flag_global |= hIsmMeta[ch]->ism_metadata_flag;
            }
        }
        /* decision about bit rates per channel - constant during the session (at one
ism_total_brate) */
        bits_ism = ism_total_brate / FRMS_PER_SECOND;
        set_s( bits_element, bits_ism / n_ISms, n_ISms );
        bits_element[n_ISms - 1] += bits_ism % n_ISms;
        bitbudget_to_brate( bits_element, element_brate, n_ISms );
        /* count ISm common signalling bits */
        if( hIsmMeta != NULL )
        {
            nb_bits_metadata[0] += n_ISms * ISM_METADATA_FLAG_BITS + n_ISms;
            for( ch = 0; ch < n_ISms; ch++ )
            {
                if( hIsmMeta[ch]->ism_metadata_flag == 0 )
                {
                    nb_bits_metadata[0] += ISM_METADATA_VAD_FLAG_BITS;
                }
            }
        }
        /* split metadata bitbudget equally between channels */
        if( nb_bits_metadata != NULL )
        {
            bits_side = sum_s( nb_bits_metadata, n_ISms );
            set_s( nb_bits_metadata, bits_side / n_ISms, n_ISms );
            nb_bits_metadata[n_ISms - 1] += bits_side % n_ISms;
            v_sub_s( bits_element, nb_bits_metadata, bits_CoreCoder, n_ISms );
            bitbudget_to_brate( bits_CoreCoder, total_brate, n_ISms );
            mvs2s( nb_bits_metadata, nb_bits_metadata, n_ISms );
        }
        /* assign less CoreCoder bit-budget to inactive streams (at least one stream must be
active) */
        if( ism_metadata_flag_global )
        {
            long diff;
            short n_higher, flag_higher[MAX_NUM_OBJECTS];
            set_s( flag_higher, 1, MAX_NUM_OBJECTS );
            diff = 0;
```

-continued

```
for( ch = 0; ch < n_ISms; ch++ )
{
    if( hIsmMeta[ch]->ism_metadata_flag == 0 && localVAD[ch] == 0 )
    {
        diff += bits_CoreCoder[ch] − BITS_ISM_INACTIVE;
        bits_CoreCoder[ch] − BITS_ISM_INACTIVE;
        flag_higher[ch] = 0;
    }
}
n_higher = sum_s( flag_higher, n_ISmS );
if( diff > 0 && n_higher > 0 )
{
    tmpL = diff / n_higher;
    for( ch = 0; ch < n_ISms; ch++ )
    {
        if( flag_higher[ch] )
        {
            bits_CoreCoder[ch] += tmpL;
        }
    }
    tmpL = diff % n_higher;
    ch = 0;
    while( flag_higher[ch] == 0 )
    {
        ch++;
    }
    bits_CoreCoder[ch] += tmpL;
}
bitbudget_to_brate( bits_CoreCoder, total_brate, n_ISms );
diff = 0;
for( ch = 0; ch < n_ISms; ch++ )
{
    long limit;
    limit = MIN_BRATE_SWB_BWE / FRMS_PER_SECOND;
    if( element_brate[ch] < MIN_BRATE_SWB_STEREO )
    {
        limit = MIN_BRATE_WB_BWE / FRMS_PER_SECOND;
    }
    else if( element_brate[ch] >= SCE_CORE_16k_LOW_LIMIT )
    {
        /*limit = SCE_CORE_16k_LOW_LIMIT;*/
        limit = (ACELP_16k_LOW_LIMIT + SWB_TBE_1k6) / FRMS_PER_SECOND;
    }
    if( ism_imp[ch] == ISM_NO_META && localVAD[ch] == 0 )
    {
        tmpL = BITS_ISM_INACTIVE;
    }
    else if( ism_imp[ch] == ISM_LOW_IMP )
    {
        tmpL = BETA_ISM_LOW_IMP * bits_CoreCoder[ch];
        tmpL = max( limit, bits_CoreCoder[ch] − tmpL );
    }
    else if( ism_imp[ch] == ISM_MEDIUM_IMP )
    {
        tmpL = BETA_ISM_MEDIUM_IMP * bits_CoreCoder[ch];
        tmpL = max( limit, bits_CoreCoder[ch] − tmpL );
    }
    else /* ism_imp[ch] == ISM_HIGH_IMP */
    {
        tmpL = bits_CoreCoder[ch];
    }
    diff += bits_CoreCoder[ch] − tmpL ;
    bits_CoreCoder[ch] = tmpL;
}
if( diff > 0 && n_higher > 0 )
{
    tmpL = diff / n_higher;
    for( ch = 0; ch < n_ISms; ch++ )
    {
        if( flag_higher[ch] )
        {
            bits_CoreCoder[ch] += tmpL;
        }
    }
    tmpL = diff % n_higher;
    ch = 0;
    while( flag_higher[ch] == 0 )
    {
        ch++;
```

-continued

```
            }
            bits_CoreCoder[ch] += tmpL;
        }
        /* verify for the maximum bitrate @12.8kHz core */
        diff = 0;
        for ( ch = 0; ch < n_ISms; ch++ )
        {
            limit_high = STEREO_512k / FRMS_PER_SECOND;
            if ( element_brate[ch] < SCE_CORE_16k_LOW_LIMIT ) /* replicate function
set_ACELP:flag( ) -> it is not intended to switch the ACELP internal sampling rate within
an Object */
            {
                limit_high = ACELP_12k8_HIGH_LIMIT / FRMS_PER_SECOND;
            }
            tmpL = min( bits_CoreCoder[ch], limit_high );
            diff += bits_CoreCoder[ch] - tmpL ;
            bits_CoreCoder[ch] = tmpL;
        }
        if ( diff > 0 )
        {
            ch = 0;
            for ( ch = 0; ch < n_ISms; ch++ )
            {
                if ( flag_higher[ch] == 0 )
                {
                    if ( diff > limit_high )
                    {
                        diff += bits_CoreCoder[ch] - limit_high;
                        bits_CoreCoder[ch] = limit_high;
                    }
                    else
                    {
                        bits_CoreCoder[ch] += diff;
                        break;
                    }
                }
            }
        }
        bitbudget_to_brate( bits_CoreCoder, total_brate, n_ISms );
    }
    return;
}
```

7.0 Hardware Implementation

Figure 8:
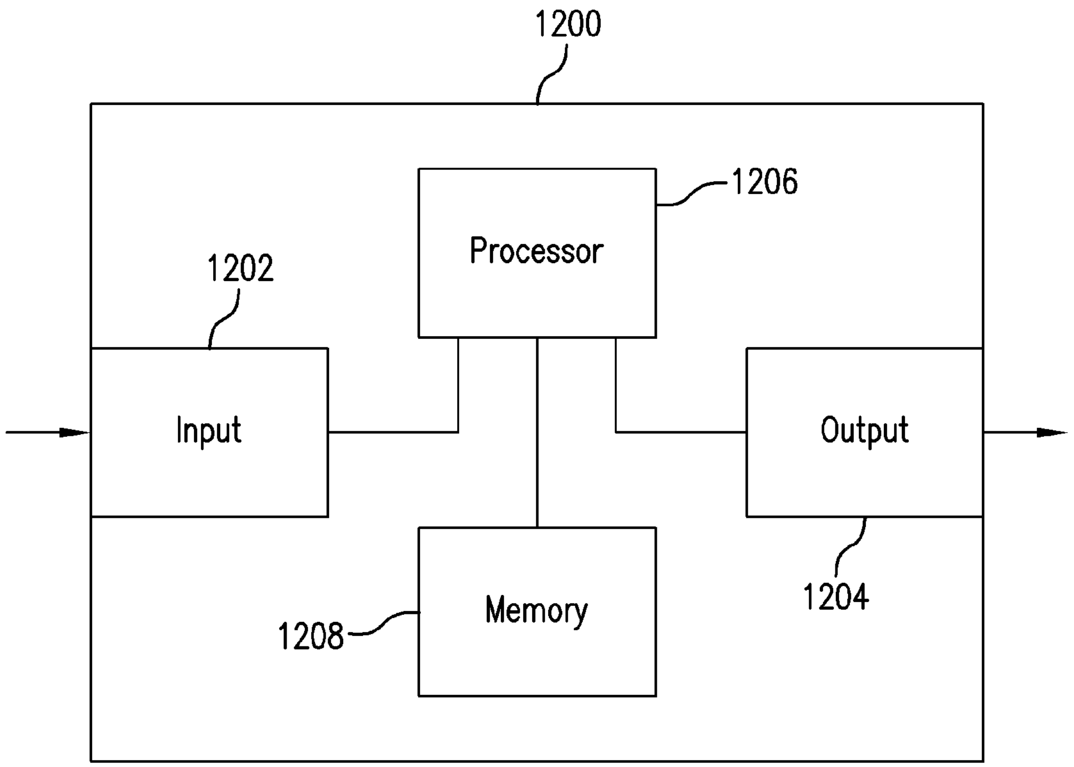
FIG. 8 is a simplified block diagram of an example configuration of hardware components implementing the system and method for coding an object-based audio signal and the system and method for decoding the object-based audio signal.

FIG. 8 is a simplified block diagram of an example configuration of hardware components forming the above described coding and decoding systems and methods.

Each of the coding and decoding systems may be implemented as a part of a mobile terminal, as a part of a portable media player, or in any similar device. Each of the coding and decoding systems (identified as 1200 in FIG. 8) comprises an input 1202, an output 1204, a processor 1206 and a memory 1208.

The input 1202 is configured to receive the input signal(s), e.g. the N audio objects 102 (N audio streams with the corresponding N metadata) of FIG. 1 or the bit-stream 701 of FIG. 7, in digital or analog form. The output 1204 is configured to supply the output signal(s), e.g. the bit-stream 111 of FIG. 1 or the M decoded audio channels 703 and the M decoded metadata 704 of FIG. 7. The input 1202 and the output 1204 may be implemented in a common module, for example a serial input/output device.

The processor 1206 is operatively connected to the input 1202, to the output 1204, and to the memory 1208. The processor 1206 is realized as one or more processors for executing code instructions in support of the functions of the various processors and other modules of FIGS. 1 and 7.

The memory 1208 may comprise a non-transient memory for storing code instructions executable by the processor(s) 1206, specifically, a processor-readable memory comprising non-transitory instructions that, when executed, cause a processor(s) to implement the operations and processors/modules of the coding and decoding systems and methods as described in the present disclosure. The memory 1208 may also comprise a random access memory or buffer(s) to store intermediate processing data from the various functions performed by the processor(s) 1206.

Those of ordinary skill in the art will realize that the description of the coding and decoding systems and methods are illustrative only and are not intended to be in any way limiting. Other embodiments will readily suggest themselves to such persons with ordinary skill in the art having the benefit of the present disclosure. Furthermore, the disclosed coding and decoding systems and methods may be customized to offer valuable solutions to existing needs and problems of encoding and decoding sound.

In the interest of clarity, not all of the routine features of the implementations of the coding and decoding systems and methods are shown and described. It will, of course, be appreciated that in the development of any such actual implementation of the coding and decoding systems and methods, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of sound processing having the benefit of the present disclosure.

In accordance with the present disclosure, the processors/modules, processing operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations and sub-operations is implemented by a processor, computer or a machine and those operations and sub-operations may be stored as a series of non-transitory code instructions readable by the processor, computer or machine, they may be stored on a tangible and/or non-transient medium.

The coding and decoding systems and methods as described herein may use software, firmware, hardware, or any combination(s) of software, firmware, or hardware suitable for the purposes described herein.

In the coding and decoding systems and methods as described herein, the various operations and sub-operations may be performed in various orders and some of the operations and sub-operations may be optional.

Although the present disclosure has been described hereinabove by way of non-restrictive, illustrative embodiments thereof, these embodiments may be modified at will within the scope of the appended claims without departing from the spirit and nature of the present disclosure.

8.0 References

The following references are referred to in the present disclosure and the full contents thereof are incorporated herein by reference

[1] 3G PP Spec. TS 26.445: "Codec for Enhanced Voice Services (EVS). Detailed Algorithmic Description," v.12.0.0, September 2014.

[2] V. Eksler, "Method and Device for Allocating a Bit-budget Between Sub-frames in a CELP Codec," PCT patent application PCT/CA2018/51175

9.0 Further Embodiments

The following embodiments (Embodiments 1 to 83) are part of the present disclosure related to the invention.

Embodiment 1. A system for coding an object-based audio signal comprising audio objects in response to audio streams with associated metadata, comprising:

an audio stream processor for analyzing the audio streams; and a metadata processor responsive to information on the audio streams from the analysis by the audio stream processor for encoding the metadata of the input audio streams.

Embodiment 2. The system of embodiment 1, wherein the metadata processor outputs information about metadata bit-budgets of the audio objects, and wherein the system further comprises a bit-budget allocator responsive to information about metadata bit-budgets of the audio objects from the metadata processor to allocate bitrates to the audio streams.

Embodiment 3. The system of embodiment 1 or 2, comprising an encoder of the audio streams including the coded metadata.

Embodiment 4. The system of any one of embodiments 1 to 3, wherein the encoder comprises a number of Core-Coders using the bitrates allocated to the audio streams by the bit-budget allocator.

Embodiment 5. The system of any one of embodiments 1 to 4, wherein the object-based audio signal comprises at least one of speech, music and general audio sound.

Embodiment 6. The system of any one of embodiments 1 to 5, wherein the object-based audio signal represents or encodes a complex audio auditory scene as a collection of individual elements, said audio objects.

Embodiment 7. The system of any one of embodiments 1 to 6, wherein each audio object comprises an audio stream with associated metadata.

Embodiment 8. The system of any one of embodiments 1 to 7, wherein the audio stream is an independent stream with metadata.

Embodiment 9. The system of any one of embodiments 1 to 8, wherein the audio stream represents an audio waveform and usually comprises one or two channels.

Embodiment 10. The system of any one of embodiments 1 to 9, wherein the metadata is a set of information that describes the audio stream and an artistic intention used to translate the original or coded audio objects to a final reproduction system.

Embodiment 11. The system of any one of embodiments 1 to 10, wherein the metadata usually describes spatial properties of each audio object.

Embodiment 12. The system of any one of embodiments 1 to 11, wherein the spatial properties include one or more of a position, orientation, volume, width of the audio object.

Embodiment 13. The system of any one of embodiments 1 to 12, wherein each audio object comprises a set of metadata referred to as input metadata defined as an unquantized metadata representation used as an input to a codec.

Embodiment 14. The system of any one of embodiments 1 to 13, wherein each audio object comprises a set of metadata referred to as coded metadata defined as quantized and coded metadata which are part of a bit-stream sent from an encoder to a decoder.

Embodiment 15. The system of any one of embodiments 1 to 14, wherein a reproduction system is structured to render the audio objects in a 3D audio space around a listener using the transmitted metadata and artistic intention at a reproduction side.

Embodiment 16. The system of any one of embodiments 1 to 15, wherein the reproduction system comprises a head-tracking device for dynamically modify the metadata during rendering the audio objects.

Embodiment 17. The system of any one of embodiments 1 to 16, comprising a framework for a simultaneous coding of several audio objects.

Embodiment 18. The system of any one of embodiments 1 to 17, wherein the simultaneous coding of several audio objects uses a fixed constant overall bitrate for encoding the audio objects.

Embodiment 19. The system of any one of embodiments 1 to 18, comprising a transmitter for transmitting a part or all of the audio objects.

Embodiment 20. The system of any one of embodiments 1 to 19, wherein, in the case of coding a combination of audio formats in the framework, a constant overall bitrate represents a sum of the bitrates of the formats.

Embodiment 21. The system of any one of embodiments 1 to 20, wherein the metadata comprises two parameters comprising azimuth and elevation.

Embodiment 22. The system of any one of embodiments 1 to 21, wherein the azimuth and elevation parameters are stored per each audio frame for each audio object.

Embodiment 23. The system of any one of embodiments 1 to 22, comprising an input buffer for buffering at least one input audio stream and input metadata associated to the audio stream.

Embodiment 24. The system of any one of embodiments 1 to 23, wherein the input buffer buffers each audio stream for one frame.

Embodiment 25. The system of any one of embodiments 1 to 24, wherein the audio stream processor analyzes and processes the audio streams.

Embodiment 26. The system of any one of embodiments 1 to 25, wherein the audio stream processor comprises at least one of the following elements: a time-domain transient detector, a spectral analyser, a long-term prediction analyser, a pitch tracker and voicing analyser, a voice/sound activity detector, a band-width detector, a noise estimator and a signal classifier.

Embodiment 27. The system of any one of embodiments 1 to 26, wherein the signal classifier performs at least one of coder type selection, signal classification, and speech/music classification.

Embodiment 28. The system of any one of embodiments 1 to 27, wherein the metadata processor analyzes, quantizes and encodes the metadata of the audio streams.

Embodiment 29. The system of any one of embodiments 1 to 28, wherein, in inactive frames, no metadata is encoded by the metadata processor and sent by the system in a bit-stream for the corresponding audio object.

Embodiment 30. The system of any one of embodiments 1 to 29, wherein, in active frames, the metadata are encoded by the metadata processor for the corresponding object using a variable bitrate.

Embodiment 31. The system of any one of embodiments 1 to 30, wherein the bit-budget allocator sums the bit-budgets of the metadata of the audio objects, and adds the sum of bit-budgets to a signaling bit-budget in order to allocate the bitrates to the audio streams.

Embodiment 32. The system of any one of embodiments 1 to 31, comprising a pre-processor to further process the audio streams when configuration and bit-rate distribution between audio streams has been done.

Embodiment 33. The system of any one of embodiments 1 to 32, wherein the pre-processor performs at least one of further classification of the audio streams, core encoder selection, and resampling.

Embodiment 34. The system of any one of embodiments 1 to 33, wherein the encoder sequentially encodes the audio streams.

Embodiment 35. The system of any one of embodiments 1 to 34, wherein the encoder sequentially encodes the audio streams using a number fluctuating bitrate Core-Coders.

Embodiment 36. The device of any one of embodiments 1 to 35, wherein the metadata processor encodes the metadata sequentially in a loop with dependency between quantization of the audio objects and metadata parameters of the audio objects.

Embodiment 37. The system of any one of embodiments 1 to 36, wherein the metadata processor, to encode a metadata parameter, quantizes a metadata parameter index using a quantization step.

Embodiment 38. The system of any one of embodiments 1 to 37, wherein the metadata processor, to encode the azimuth parameter, quantizes an azimuth index using a quantization step and, to encode the elevation parameter, quantizes an elevation index using a quantization step.

Embodiment 39. The device of any one of embodiments 1 to 38, wherein a total metadata bit-budget and a number of quantization bits are dependent on a codec total bitrate, a metadata total bitrate, or a sum of metadata bit budget and Core-Coder bit budget related to one audio object.

Embodiment 40. The system of any one of embodiments 1 to 39, wherein the azimuth and elevation parameters are represented as one parameter.

Embodiment 41. The system of any one of embodiments 1 to 40, wherein the metadata processor encodes the metadata parameter indexes either absolutely or differentially.

Embodiment 42. The system of any one of embodiments 1 to 41, wherein the metadata processor encodes the metadata parameter indices using absolute coding when there is a difference between current and previous parameter indices that results in a higher or equal number of bits needed for the differential coding than the absolute coding.

Embodiment 43. The system of any one of embodiments 1 to 42, wherein the metadata processor encodes the metadata parameter indices using absolute coding when there were no metadata present in a previous frame.

Embodiment 44. The system of any one of embodiments 1 to 43, wherein the metadata processor encodes the metadata parameter indices using absolute coding when a number of consecutive frames using differential coding is higher than a number of maximum consecutive frames coded using differential coding.

Embodiment 45. The system of any one of embodiments 1 to 44, wherein the metadata processor, when encoding the metadata parameter indices using absolute coding, writes an absolute coding flag distinguishing between absolute and differential coding following a metadata parameter absolute coded index.

Embodiment 46. The system of any one of embodiments 1 to 45, wherein the metadata processor, when encoding the metadata parameter indices using differential coding, sets the absolute coding flag to 0 and writes a zero coding flag, following the absolute coding flag, signaling if the difference between a current and a previous frame index is 0.

Embodiment 47. The system of any one of embodiments 1 to 46, wherein, if the difference between a current and a previous frame index is not equal to 0, the metadata processor continues coding by writing a sign flag followed by an adaptive-bits difference index.

Embodiment 48. The system of any one of embodiments 1 to 47, wherein the metadata processor uses an intra-object metadata coding logic to limit a range of metadata bit-budget fluctuation between frames and to avoid too low a bit-budget left for the core coding.

Embodiment 49. The system of any one of embodiments 1 to 48, wherein the metadata processor, in accordance with the intra-object metadata coding logic, limits the use of absolute coding in a given frame to one metadata parameter only or to a number as low as possible of metadata parameters.

Embodiment 50. The system of any one of embodiments 1 to 49, wherein the metadata processor, in accordance with the intra-object metadata coding logic, avoids absolute coding of an index of one metadata parameter if the index of another metadata coding logic was already coded using absolute coding in a same frame.

Embodiment 51. The system of any one of embodiments 1 to 50, wherein the intra-object metadata coding logic is bitrate dependent.

Embodiment 52. The system of any one of embodiments 1 to 51, wherein the metadata processor uses an inter-object metadata coding logic used between metadata coding of different objects to minimize a number of absolutely coded metadata parameters of different audio objects in a current frame.

Embodiment 53. The system of any one of embodiments 1 to 52, wherein the metadata processor, using the inter-object metadata coding logic, controls frame counters of absolutely coded metadata parameters.

Embodiment 54. The system of any one of embodiments 1 to 53, wherein the metadata processor, using the inter-object metadata coding logic, when the metadata parameters of the audio objects evolve slowly and smoothly, codes (a) a first metadata parameter index of a first audio object using absolute coding in a frame M, (b) a second metadata parameter index of the first audio object using absolute coding in a frame M+1, (c) the first metadata parameter index of a second audio object using absolute coding in a frame M+2, and (d) the second metadata parameter index of the second audio object using absolute coding in a frame M+3.

Embodiment 55. The system of any one of embodiments 1 to 54, wherein the inter-object metadata coding logic is bitrate dependent.

Embodiment 56. The system of any one of embodiments 1 to 55, wherein the bit-budget allocator uses a bitrate adaptation algorithm to distribute the bit-budget for encoding the audio streams.

Embodiment 57. The system of any one of embodiments 1 to 56, wherein the bit-budget allocator, using the bitrate adaptation algorithm, obtains a metadata total bit-budget from a metadata total bitrate or codec total bitrate.

Embodiment 58. The system of any one of embodiments 1 to 57, wherein the bit-budget allocator, using the bitrate adaptation algorithm, computes an element bit-budget by dividing the metadata total bit-budget by the number of audio streams.

Embodiment 59. The system of any one of embodiments 1 to 58, wherein the bit-budget allocator, using the bitrate adaptation algorithm, adjusts the element bit-budget of a last audio stream to spend all available metadata bit-budget.

Embodiment 60. The system of any one of embodiments 1 to 59, wherein the bit-budget allocator, using the bitrate adaptation algorithm, sums a metadata bit-budget of all the audio objects and adds said sum to a metadata common signaling bit-budget resulting in a Core-Coder side bit-budget.

Embodiment 61. The system of any one of embodiments 1 to 60, wherein the bit-budget allocator, using the bitrate adaptation algorithm, (a) splits the Core-Coder side bit-budget equally between the audio objects and (b) uses the split Core-Coder side bit-budget and the element bit-budget to compute a Core-Coder bit-budget for each audio stream.

Embodiment 62. The system of any one of embodiments 1 to 61, wherein the bit-budget allocator, using the bitrate adaptation algorithm, adjusts the Core-Coder bit-budget of a last audio stream to spend all available Core-Coder bit-budget.

Embodiment 63. The system of any one of embodiments 1 to 62, wherein the bit-budget allocator, using the bitrate adaptation algorithm, computes a bitrate for encoding one audio stream in a Core-Coder using the Core-Coder bit-budget.

Embodiment 64. The system of any one of embodiments 1 to 63, wherein the bit-budget allocator, using the bitrate adaptation algorithm in inactive frames or in frames with low energy, lowers and sets to a constant value the bitrate for encoding one audio stream in a Core-Coder, and redistribute a saved bit-budget between the audio streams in active frames.

Embodiment 65. The system of any one of embodiments 1 to 64, wherein the bit-budget allocator, using the bitrate adaptation algorithm in active frames, adjusts the bitrate for encoding one audio stream in a Core-Coder based on a metadata importance classification.

Embodiment 66. The system of any one of embodiments 1 to 65, wherein the bit-budget allocator, in inactive frames (VAD=0), lowers the bitrate for encoding one audio stream in a Core-Coder and redistribute a bit-budget saved by said bitrate lowering between audio streams in frames classified as active.

Embodiment 67. The system of any one of embodiments 1 to 66, wherein the bit-budget allocator, in a frame, (a) sets to every audio stream with inactive content a lower, constant Core-Coder bit-budget, (b) computes a saved bit-budget as a difference between the lower constant Core-Coder bit-budget and the Core-Coder bit-budget, and (c) redistributes the saved bit-budget between the Core-Coder bit-budget of the audio streams in active frames.

Embodiment 68. The system of any one of embodiments 1 to 67, wherein the lower, constant bit-budget is dependent upon the metadata total bit-rate.

Embodiment 69. The system of any one of embodiments 1 to 68, wherein the bit-budget allocator computes the bitrate to encode one audio stream in a Core-Coder using the lower constant Core-Coder bit-budget.

Embodiment 70. The system of any one of embodiments 1 to 69, wherein the bit-budget allocator uses an inter-object Core-Coder bitrate adaptation based on a classification of metadata importance.

Embodiment 71. The system of any one of embodiments 1 to 70, wherein the metadata importance is based on a metric indicating how critical coding of a particular audio object at a current frame to obtain a decent quality of the decoded synthesis is.

Embodiment 72. The system of any one of embodiments 1 to 71, wherein the bit-budget allocator bases the classification of metadata importance on at least one of the following parameters: coder type (coder_type), FEC signal classification (class), speech/music classification decision, and SNR estimate from the open-loop ACELP/TCX core decision module (snr_celp, snr_tcx).

Embodiment 73. The system of any one of embodiments 1 to 72, wherein the bit-budget allocator bases the classification of metadata importance on the coder type (coder type).

Embodiment 74. The system of any one of embodiments 1 to 73, wherein the bit-budget allocator defines the four following distinct metadata importance classes ($class_{ISm}$):

- No metadata class, ISM_NO_META: frames without metadata coding, for example in inactive frames with VAD=0
- Low importance class, ISM_LOW_IMP: frames where coder_type=UNVOICED or INACTIVE
- Medium importance class, ISM_MEDIUM_IMP: frames where coder_type=VOICED
- High importance class ISM_HIGH_IMP: frames where coder type=GENERIC).

Embodiment 75. The system of any one of embodiments 1 to 74, wherein the bit-budget allocator uses the metadata importance class in the bitrate adaptation algorithm to assign a higher bit-budget to audio streams with a higher importance and a lower bit-budget to audio streams with a lower importance.

Embodiment 76. The system of any one of embodiments 1 to 75, wherein the bit-budget allocator uses, in a frame, the following logic:

1. $class_{ISm}$=ISM_NO_META frames: the lower constant Core-Coder bitrate is assigned;

2. $class_{ISm}$=ISM_LOW_IMP frames: the bitrate to encode one audio stream in a Core-Coder (total brate) is lowered as $$total\_brate_{new}[n]=\max(\alpha_{low}*total\_brate[n],B_{low})$$

where the constant $\alpha_{low}$ is set to a value lower than 1.0, and the constant $B_{low}$ is a minimum bitrate threshold supported by the Core-Coder;

3. $class_{ISm}$=ISM_MEDIUM_IMP frames: the bitrate to encode one audio stream in a Core-Coder (total_brate) is lowered as $$total\_brate_{new}[n]=\max(\alpha_{med}*total\_brate[n],B_{low})$$

where the constant $\alpha_{med}$ is set to a value lower than 1.0 but higher than a value $\alpha_{low}$;

4. $class_{ISm}$=ISM_HIGH_IMP frames: no bitrate adaptation is used.

Embodiment 77. The system of any one of embodiments 1 to 76, wherein the bit-budget allocator redistributes a saved bit-budget expressed as a sum of differences between the previous and new bitrates total brate between the audio streams in frames classified as active.

Embodiment 78. A system for decoding audio objects in response to audio streams with associated metadata, comprising:

a metadata processor for decoding metadata of the audio streams with active contents;

a bit-budget allocator responsive to the decoded metadata and respective bit-budgets of the audio objects to determine Core-Coder bitrates of the audio streams; and a decoder of the audio streams using the Core-Coder bitrates determined in the bit-budget allocator.

Embodiment 79. The system of embodiment 78, wherein the metadata processor is responsive to metadata common signaling read from an end of a received bitstream.

Embodiment 80. The system of embodiment 78 or 79, wherein the decoder comprises Core-Decoders to decode the audio streams.

Embodiment 81. The system of any one of embodiments 78 to 80, wherein the Core-Decoders comprise fluctuating bitrate Core-Decoders to sequentially decode the audio streams at their respective Core-Coder bitrates.

Embodiment 82. The system of any one of embodiments 78 to 81, wherein a number of decoded audio objects is lower than a number of Core-Decoders.

Embodiment 83. The system of any one of embodiments 78 to 83, comprising a renderer of audio objects in response to the decoded audio streams and decoded metadata.

Any of embodiments 2 to 77 further describing the elements of embodiments 78 to 83 can be implemented in any of these embodiments 78 to 83. As an example, the Core-Coder bitrates per audio stream in the decoding system are determined using the same procedure as in the coding system.

The present invention is also concerned with a method of coding and a method of decoding. In this respect, system embodiments 1 to 83 can be drafted as method embodiments in which the elements of the system embodiments are replaced by an operation performed by such elements.

What is claimed is:

1. A system for coding an object-based audio signal comprising audio objects in response to audio streams with associated metadata, comprising:

at least one processor; and a memory coupled to the processor and storing non-transitory instructions that when executed cause the processor to implement:

an audio stream processor for analyzing the audio streams to extract from the audio streams information usable to classify the audio streams into importance classes;

a metadata processor for coding the metadata prior to and separately from coding of the audio streams using processing adapted to the metadata and, after the metadata are coded, for generating information about bit-budgets used by the metadata processor for the coding of the metadata of the audio objects;

a bit-budget allocator comprising a classifier of the audio streams into the importance classes in response to the extracted importance classification information from the audio stream processor, wherein the bit-budget allocator is responsive to the information about the bit-budgets for the coding of the metadata of the audio objects from the metadata processor and the importance classes in which the audio streams are classified to allocate bitrates for the coding of the audio streams;

an encoder for coding the audio streams using the bitrates allocated by the bit-budget allocator for the coding of the audio streams;

a multiplexer for writing the coded metadata and audio streams into a bit-stream; and a transmitter of the bit-stream to a distant decoder.

2. The system according to claim 1, wherein the audio stream processor for analyzing the audio streams provides information on the audio streams to the metadata processor.

3. The system according to claim 1, wherein the bit-budget allocator uses a bitrate adaptation algorithm to distribute an available bit-budget for coding the audio streams.

4. The system according to claim 3, wherein the bit-budget allocator, using the bitrate adaptation algorithm, calculates an audio stream and metadata (ISm) total bit-budget from an ISm total bitrate for coding the audio streams and the associated metadata or a codec total bitrate.

5. The system according to claim 4, wherein the bit-budget allocator, using the bitrate adaptation algorithm, computes an element bit-budget by dividing the ISm total bit-budget by a number of the audio streams.

6. The system according to claim 5, wherein the bit-budget allocator, using the bitrate adaptation algorithm, adjusts the element bit-budget of a last audio object to spend all the ISm total bit-budget.

7. The system according to claim 5, wherein the element bit-budget is constant at one ISm total bit-budget.

8. The system according to claim 5, wherein the bit-budget allocator, using the bitrate adaptation algorithm, sums the bit-budgets for the coding of the metadata of the audio objects and adds said sum to an ISm common signaling bit-budget resulting in a codec side bit-budget.

9. The system according to claim 8, wherein the bit-budget allocator, using the bitrate adaptation algorithm, (a) splits the codec side bit-budget equally between the audio objects and (b) uses the split codec side bit-budget and the element bit-budget to compute an encoding bit-budget for each audio stream.

10. The system according to claim 9, wherein the bit-budget allocator, using the bitrate adaptation algorithm, adjusts the encoding bit-budget of a last audio stream to spend all available encoding bit-budget.

11. The system according to claim 9, wherein the bit-budget allocator, using the bitrate adaptation algorithm, computes a bitrate for coding one of the audio streams using the encoding bit-budget for the audio stream.

12. The system according to claim 3, wherein the bit-budget allocator, using the bitrate adaptation algorithm with audio streams with inactive contents or without meaningful content, lowers a value of a bitrate for coding one of the audio streams, and redistribute a saved bit-budget between the audio streams with active content.

13. The system according to claim 12, wherein the bit-budget allocator, using the bitrate adaptation algorithm with audio streams with inactive content or without meaningful content, lowers and sets to a constant value a bit-budget for coding the audio streams.

14. The system according to claim 12, wherein the bit-budget allocator computes the saved bit-budget as a difference between a lowered value of the bit-budget for coding the audio stream and a non-lowered value of the bit-budget for coding the audio stream.

15. The system according to claim 14, wherein the bit-budget allocator computes a bitrate for coding the audio stream using the lowered value of the bit-budget.

16. The system according to claim 3, wherein the importance classes comprise a highest audio stream and metadata (ISm) importance class, a lowest ISm importance class and one or many medium ISm importance classes, and wherein the bit-budget allocator, using the bitrate adaptation algorithm:

- assigns a given lower bitrate to the audio streams with lowest ISm importance;
- lowers a bitrate of the audio streams with medium ISm importance;
- performs no bitrate adaptation to audio streams with highest ISm importance; and
- redistributes equally between the audio streams with active content a saved bit-budget obtained by assigning the given lower bitrate to the audio streams with lowest ISm importance and lowering the bitrate of the audio streams with medium ISm importance.

17. The system according to claim 16, wherein the classifier classifies the ISm importance based on a metric indicating how critical coding of an audio object to obtain a given quality of a decoded synthesis is.

18. The system according to claim 16, wherein the classifier classifies the ISm importance based on at least one parameter in the following group of parameters: audio stream encoder type, FEC (Forward Error Correction), sound signal classification, speech/music classification, and SNR (Signal-to-Noise Ratio) estimate.

19. The system according to claim 18, wherein the classifier classifies the ISm importance based on the audio stream encoder type (coder_type) and defines the following ISm importance classes ($class_{ISm}$):

- No metadata class, ISM_NO_META: frames without metadata coding;
- Low importance class, ISM_LOW_IMP: frames where coder_type=UNVOICED or INACTIVE;
- Medium importance class, ISM_MEDIUM_IMP: frames where coder_type=VOICED; and
- High importance class ISM_HIGH_IMP: frames where coder_type=GENERIC.

20. The system according to claim 19, wherein the bit-budget allocator uses, for each audio stream in a frame, the following logic:

- $class_{ISm}$=ISM_NO_META frame: a constant lower bitrate is assigned for coding the audio stream;
- $class_{ISm}$=ISM_LOW_IMP or $class_{ISm}$=ISM_MEDIUM_IMP frame: the bitrate for coding the audio stream is lowered using a given relation; and
- $class_{ISm}$=ISM_HIGH_IMP frame: no bitrate adaptation is used.

21. The system according to claim 16, wherein the bit-budget allocator uses the ISm importance classification in the bitrate adaptation algorithm to increase the bit-budget for the coding of audio streams with higher ISm importance and lower the bit-budget for the coding of audio streams with lower ISm importance.

22. The system according to claim 16, wherein the bit-budget allocator redistributes for each audio stream in a frame a saved bit-budget between the audio streams with active content.

23. A method for coding an object-based audio signal comprising audio objects in response to audio streams with associated metadata, comprising:

- analyzing the audio streams to extract from the audio streams information usable to classify the audio streams into importance classes;
- coding the metadata prior to and separately from coding of the audio streams using processing adapted to the metadata and, after the metadata are coded, generating information about bit-budgets used for the coding of the metadata of the respective audio objects;
- classifying the audio streams into the importance classes in response to the extracted importance classification information;
- allocating bitrates for the coding of the audio streams in response to the information about the bit-budgets for the coding of the metadata of the audio objects and the importance classes in which the audio streams are classified;
- coding the audio streams using the bitrates allocated for the coding of the audio streams;
- writing the coded metadata and audio streams into a bit-stream; and
- transmitting the bit-stream to a distant decoder.

24. The method according to claim 23, wherein analyzing the audio streams comprises providing information on the audio streams for the coding of the metadata.

25. The method according to claim 23, wherein the allocation of bitrates for the coding of the audio streams comprises using a bitrate adaptation algorithm to distribute an available bit-budget for coding the audio streams.

26. The method according to claim 25, wherein the allocation of bitrates for the coding of the audio streams, using the bitrate adaptation algorithm, comprises calculating an audio stream and metadata (ISm) total bit-budget from an ISm total bitrate for coding the audio streams and the associated metadata or a codec total bitrate.

27. The method according to claim 26, wherein the allocation of bitrates for the coding of the audio streams, using the bitrate adaptation algorithm, comprises computing an element bit-budget by dividing the ISm total bit-budget by a number of the audio streams.

28. The method according to claim 27, wherein the allocation of bitrates for the coding of the audio streams, using the bitrate adaptation algorithm, comprises adjusting the element bit-budget of a last audio object to spend all the ISm total bit-budget.

29. The method according to claim 27, wherein the element bit-budget is constant at one ISm total bit-budget.

30. The method according to claim 27, wherein the allocation of bitrates for the coding of the audio streams, using the bitrate adaptation algorithm, comprises summing the bit-budgets for the coding of the metadata of the audio objects and adding said sum to an ISm common signaling bit-budget resulting in a codec side bit-budget.

31. The method according to claim 30, wherein the allocation of bitrates for the coding of the audio streams, using the bitrate adaptation algorithm, comprises (a) splitting the codec side bit-budget equally between the audio objects and (b) using the split codec side bit-budget and the element bit-budget to compute an encoding bit-budget for each audio stream.

32. The method according to claim 31, wherein the allocation of bitrates for the coding of the audio streams, using the bitrate adaptation algorithm, comprises adjusting the encoding bit-budget of a last audio stream to spend all available encoding bit-budget.

33. The method according to claim 31, wherein the allocation of bitrates for the coding of the audio streams, using the bitrate adaptation algorithm, comprises computing a bitrate for coding one of the audio streams using the encoding bit-budget for the audio stream.

34. The method according to claim 25, wherein the allocation of bitrates for the coding of the audio streams, using the bitrate adaptation algorithm with audio streams with inactive contents or without meaningful content, comprises lowering a value of a bitrate for coding one of the audio streams, and redistribute a saved bit-budget between the audio streams with active content.

35. The method according to claim 34, wherein the allocation of bitrates for the coding of the audio streams, using the bitrate adaptation algorithm with audio streams with inactive content or without meaningful content, comprises lowering and setting to a constant value a bit-budget for coding the audio streams.

36. The method according to claim 34, wherein the allocation of bitrates for the coding of the audio streams comprises computing the saved bit-budget as a difference between a lowered value of the bit-budget for coding the audio stream and a non-lowered value of the bit-budget for coding the audio stream.

37. The method according to claim 36, wherein the allocation of bitrates for the coding of the audio streams comprises computing a bitrate for coding the audio stream using the lowered value of the bit-budget.

38. The method according to claim 25, wherein the importance classes comprise a highest audio stream and metadata (ISm) importance class, a lowest ISm importance class and one or many medium ISm importance classes, and wherein the allocation of bitrates for the coding of the audio streams, using the bitrate adaptation algorithm, comprises:

- assigning a given lower bitrate to the audio streams with lowest ISm importance;
- lowering a bitrate of the audio streams with medium ISm importance;
- performing no bitrate adaptation to audio streams with highest ISm importance; and
- redistributes equally between the audio streams with active content a saved bit-budget obtained by assigning the given lower bitrate to the audio streams with lowest ISm importance and lowering the bitrate of the audio streams with medium ISm importance.

39. The method according to claim 38, comprising classifying the ISm importance based on a metric indicating how critical coding of an audio object to obtain a given quality of a decoded synthesis is.

40. The method according to claim 38, comprising classifying the ISm importance based on at least one parameter in the following group of parameters: audio stream encoder type, FEC (Forward Error Correction), sound signal classification, speech/music classification, and SNR (Signal-to-Noise Ratio) estimate.

41. The method according to claim 40, comprising classifying the ISm importance based on the audio stream encoder type (coder_type), wherein classifying the ISm importance comprises defining the following ISm importance classes ($class_{ISm}$):

- No metadata class, ISM_NO_META: frames without metadata coding;
- Low importance class, ISM_LOW_IMP: frames where coder_type=UNVOICED or INACTIVE;
- Medium importance class, ISM_MEDIUM_IMP: frames where coder_type=VOICED; and
- High importance class ISM_HIGH_IMP: frames where coder_type=GENERIC.

42. The method according to claim 41, wherein the allocation of bitrates for the coding of the audio streams comprises using, for each audio stream in a frame, the following logic:

- $class_{ISm}$=ISM_NO_META frame: a constant lower bitrate is assigned for coding the audio stream;
- $class_{ISm}$=ISM_LOW_IMP or $class_{ISm}$=ISM_MEDIUM_IMP frame: the bitrate for coding the audio stream is lowered using a given relation; and
- $class_{ISm}$=ISM_HIGH_IMP frame: no bitrate adaptation is used.

43. The method according to claim 38, wherein the allocation of bitrates for the coding of the audio streams comprises using the ISm importance classification in the bitrate adaptation algorithm to increase the bit-budget for the coding of audio streams with higher ISm importance and lower the bit-budget for the coding of audio streams with lower ISm importance.

44. A system for coding an object-based audio signal comprising audio objects in response to audio streams with associated metadata, comprising:

- at least one processor; and
- a memory coupled to the processor and storing non-transitory instructions that when executed cause the processor to:
  - analyze the audio streams to extract from the audio streams information usable to classify the audio streams into importance classes;
  - code the metadata prior to and separately from coding of the audio streams using processing adapted to the metadata and, after the metadata are coded, generate information about bit-budgets used for the coding of the metadata of the respective audio objects;
  - classify the audio streams into the importance classes in response to the extracted importance classification information;
  - allocate bitrates for the coding of the audio streams in response to the information about the bit-budgets for the coding of the metadata of the audio objects and the importance classes in which the audio streams are classified;
  - code the audio streams using the bitrates allocated for the coding of the audio streams;
  - write the coded metadata and audio streams into a bit-stream; and
  - transmit the bit-stream to a distant decoder.

* * * * *